United States Patent
Nomura et al.

(10) Patent No.: US 11,349,632 B2
(45) Date of Patent: May 31, 2022

(54) TRANSMISSION RECEPTION DEVICE AND DISTORTION COMPENSATION METHOD

(71) Applicant: FUJITSU LIMITED, Kawasaki (JP)

(72) Inventors: Yoshitaka Nomura, Shinagawa (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/177,564

(22) Filed: Feb. 17, 2021

(65) Prior Publication Data
US 2021/0297229 A1 Sep. 23, 2021

(30) Foreign Application Priority Data
Mar. 19, 2020 (JP) ............... JP2020-049178

(51) Int. Cl.
*H04L 7/00* (2006.01)
*H04B 1/10* (2006.01)

(52) U.S. Cl.
CPC ......... *H04L 7/0016* (2013.01); *H04B 1/1027* (2013.01); *H04L 7/0079* (2013.01)

(58) Field of Classification Search
CPC .......... H04L 7/0016; H04L 7/0079; H04L 25/03019; H04L 27/01; H04B 1/10; H04B 1/1027; H04B 10/616; H04B 10/697; H04B 10/6971
See application file for complete search history.

(56) References Cited

U.S. PATENT DOCUMENTS

2010/0209121 A1 8/2010 Tanimura
2018/0351588 A1 12/2018 Ohta
2021/0050883 A1* 2/2021 Noda ............... H04B 7/005

FOREIGN PATENT DOCUMENTS

JP 2010-193204 A 9/2010
JP 2018-133740 A 8/2018
JP 2018-207321 A 12/2018

* cited by examiner

*Primary Examiner* — Betsy Deppe
(74) *Attorney, Agent, or Firm* — Fujitsu Patent Center

(57) ABSTRACT

A transmission device includes a receiver configured to receive a frame signal including synchronization data, main signal data, and an error correction code, a compensator configured to compensate for distortion of the frame signal based on a compensation coefficient, a detector configured to detect synchronization timing of the frame signal from the synchronization data; a corrector configured to correct an error of the frame signal after the distortion is compensated, based on the error correction code according to the synchronization timing, a generator configured to generate a replica signal from the frame signal after the error is corrected by the corrector, based on the synchronization timing, the replica signal corresponding to the frame signal before the distortion is compensated, and an update processor configured to update the compensation coefficient based on the replica signal and the frame signal before the distortion is compensated.

12 Claims, 19 Drawing Sheets

TRANSMISSION RECEPTION DEVICE AND DISTORTION COMPENSATION METHOD

CROSS-REFERENCE TO RELATED APPLICATION

This application is based upon and claims the benefit of priority of the prior Japanese Patent Application No. 2020-049178 filed on Mar. 19, 2020, the entire contents of which are incorporated herein by reference.

FIELD

A certain aspect of the embodiments is related to a reception device and a distortion compensation method.

BACKGROUND

In response to increase in a demand for large-capacity data transmission, a digital coherent transmission system capable of transmitting data of 100 Gbps or more with a wavelength light is researched and developed for example (see Japanese Laid-open Patent Publications No. 2010-193204). In the digital coherent transmission system, multi-level modulation using an intensity and a phase of light is used. Examples of the multi-level modulation include phase shift keying (PSK) and quadrature amplitude modulation (QAM).

The higher the number of multi-levels and a symbol rate of the multi-level modulation, the more easily a transmission performance deteriorates due to various factors, and the shorter a transmission distance. An example of such deterioration in transmission performance is signal distortion caused by the characteristics of a transmission element in the transmission device. The transmission device compensates for the signal distortion of a main signal received from another transmission device by a compensation circuit such as an FIR (Finite Impulse Response) filter. The compensation circuit calculates a tap coefficient of the FIR filter based on a compensation signal with a predetermined pattern imparted to the main signal by the transmission device on a transmitting side.

SUMMARY

According to an aspect of the present disclosure, there is provided a reception device including a receiver configured to receive a frame signal including synchronization data, main signal data, and an error correction code; a compensator configured to compensate for distortion of the frame signal based on a compensation coefficient; a detector configured to detect synchronization timing of the frame signal from the synchronization data; a corrector configured to correct an error of the frame signal after the distortion is compensated, based on the error correction code according to the synchronization timing; a generator configured to generate a replica signal from the frame signal after the error is corrected by the corrector, based on the synchronization timing, the replica signal corresponding to the frame signal before the distortion is compensated; and an update processor configured to update the compensation coefficient based on the replica signal and the frame signal before the distortion is compensated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since the above-mentioned signal distortion changes with a temperature and the elapse of time, the transmission device on the transmitting side periodically imparts the compensation signal with a fixed data pattern to the main signal, for example, and the compensation circuit updates the tap coefficient based on the compensation signal acquired at regular intervals.

However, when the transmission device on the transmitting side imparts the compensation signal to the main signal, a large-capacity memory for storing the compensation signal is required for a transmission device on a receiving side, and also a transmission band that can be allocated to the main signal is reduced.

According to the present embodiment, it is possible to compensate for distortion of a main signal to which a signal for distortion compensation is not imparted.

Figure 1:
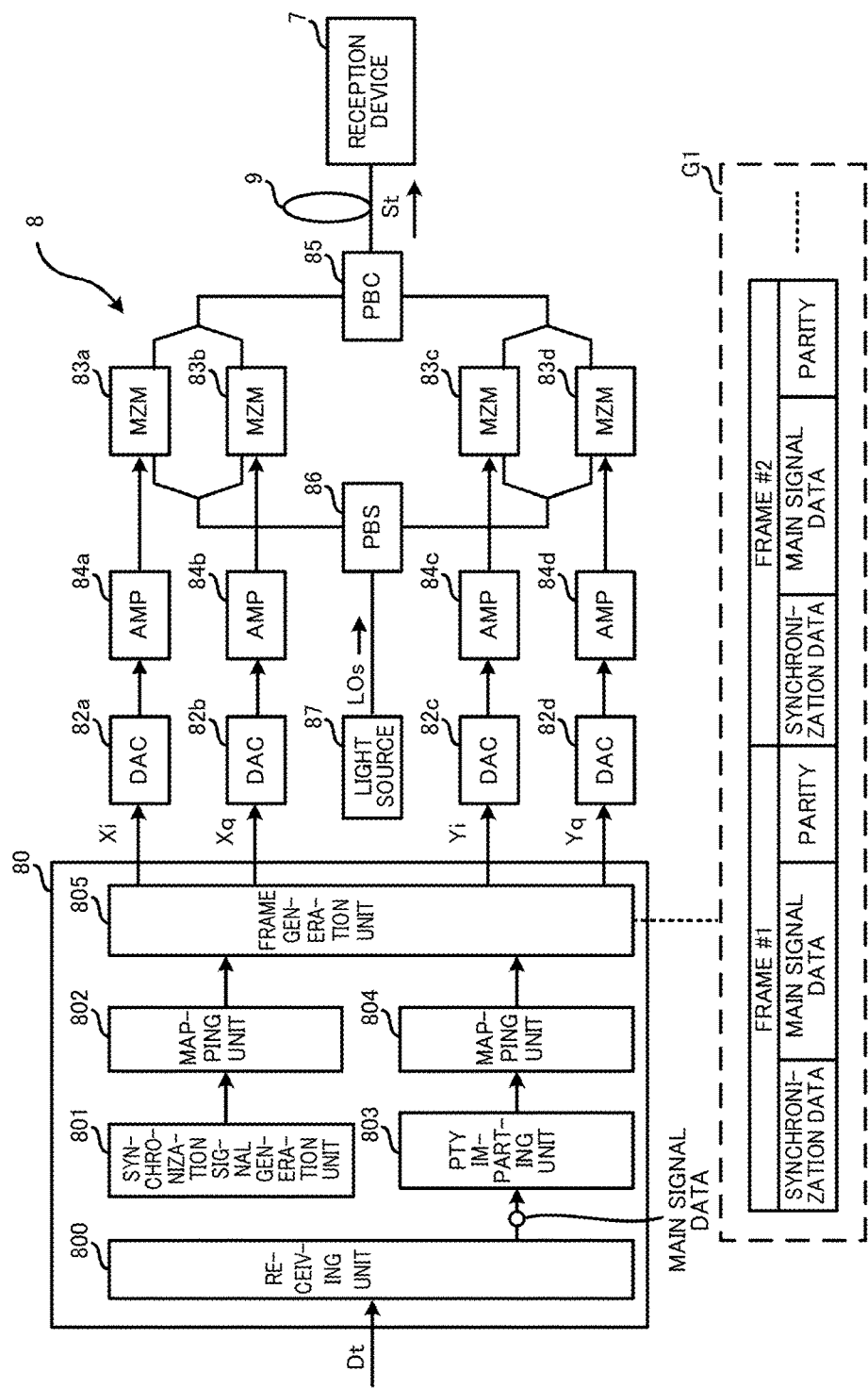
FIG. 1 is a block diagram illustrating an example of a transmission device on a transmitting side.

FIG. 1 is a block diagram illustrating an example of a transmission device 8 on the transmitting side. Using a polarization multiplexing system, the transmission device 8 transmits an optical signal St to a reception device 7 on the receiving side via a transmission line 9 such as an optical fiber according to a digital coherent optical transmission system.

The transmission device 8 includes a transmission processing circuit 80, digital-to-analog converters (DACs) 82a to 82d, and Mach-Zehnder Modulators (MZM) 83a to 83d. Further, the transmission device 8 includes amplifiers (AMPs) 84a to 84d, a polarization beam combiner (PBC) 85, a polarization beam splitter (PBS) 86, and a light source 87.

The transmission processing circuit 80 generates electric field signals Xi, Xq, Yi, and Yq from a data signal Dt input from another device. The transmission processing circuit 80 includes a receiving unit 800, a synchronization signal generation unit 801, mapping units 802, 804, a parity (PTY) imparting unit 803, and a frame generation unit 805. An example of the transmission processing circuit 80 includes a Digital Signal Processor (DSP). The transmission processing circuit 80 is not limited to this, but may also be a Field Programmable Gate Array (FPGA), for example.

The receiving unit 800 receives a data signal Dt from another device. The data signal Dt is an Ethernet (registered trademark) signal, for example. The receiving unit 800 extracts a main signal data from the data signal Dt and outputs the main signal data to the PTY imparting unit 803.

The synchronization signal generation unit 801 generates synchronization data and outputs the synchronization data to the mapping unit 802. The synchronization data is fixed pattern data, for example, and is data for establishing frame synchronization of a frame signal that stores main signal data.

The mapping unit 802 maps the synchronization data to symbol data according to a modulation system of QPSK (Quadrature Phase Shift Keying), for example. The mapping unit 802 outputs the symbol data to the frame generation unit 805.

The PTY imparting unit 803 calculates a parity from the main signal data, imparts it to the main signal data, and outputs the main signal data with the parity to the mapping unit 804. The parity is an example of an error correction code which the reception device 7 on the receiving side uses to correct an error in the main signal data.

The mapping unit 804 maps the main signal data and the parity to the symbol data according to a modulation system of QAM (Quadrature Amplitude Modulation), for example. The mapping unit 804 outputs the symbol data to the frame generation unit 805. The mapping unit 804 may use multi-level modulation different from the multi-level modulation of the mapping unit 802 of the synchronous data, or may use the same multi-level modulation as the multi-level modulation of the mapping unit 802 of the synchronous data.

The frame generation unit 805 generates a frame signal from the symbol data input from the mapping units 802 and 804. The frame signal is the main signal transmitted to the reception device 7 on the receiving side, and includes a plurality of consecutive frames #1, #2, ... on the time axis as indicated by a reference character G1. Each of the frames #1, #2, ... includes the synchronization data, the main signal data and the parity. The synchronization data, the main signal data, and the parity have predetermined amounts of data, respectively. The frame generation unit 805 outputs the frame signals to the DACs 82a to 82d as four electric field signals Xi, Xq, Yi, and Yq as an example.

The electric field signals Xi and Xq are signals having an I component and a Q component (in-phase component and orthogonal phase component) of an X-polarized wave of the optical signal St transmitted by the transmission device 8, respectively. The electric field signals Yi and Yq are signals having the I component and the Q component of a Y-polarized wave orthogonal to the X-polarized wave of the optical signal St, respectively.

The DACs 82a to 82d convert the electric field signals Xi, Xq, Yi, and Yq into analog signals, respectively. The AMPs 84a to 84d amplify the electric field signals Xi, Xq, Yi, and Yq converted into the analog signals. The amplified electric field signals Xi, Xq, Yi, and Yq are input to MZM 83a to 83d, respectively. The DACs 82a to 82d may be included in the transmission processing circuit 80.

The light source 87 is composed of a laser diode or the like, for example, and outputs transmission light LOs having a predetermined center frequency to the PBS 86. The PBS 86 separates the transmission light LOs into an X-axis and a Y-axis (polarization axes). An X-polarized wave component of the transmission light LOs is input to each of the MZMs 83a and 83b, and a Y-polarized wave component of the transmission light LOs is input to each of the MZMs 83c and 83d.

The MZM 83a to 83d optically modulate the transmission light LOs based on the analog signals from the DACs 82a to 82d. More specifically, the MZM 83a and 83b optically modulate the X-polarized wave component of the transmission light LOs based on the analog signals from the DACs 82a and 82b. The MZM 83c and 83d optically modulate the X-polarized wave component of the transmission light LOs based on the analog signals from the DACs 82c and 82d.

The X-polarized wave component and the Y-polarized wave component of the optically modulated transmission light LOs are input to the PBC 85. The PBC 85 generates the optical signal St by polarization-synthesizing the X-polarized wave component and the Y-polarized wave component of the transmission light LOs and outputs the optical signal St to the transmission line 9.

Figure 2:
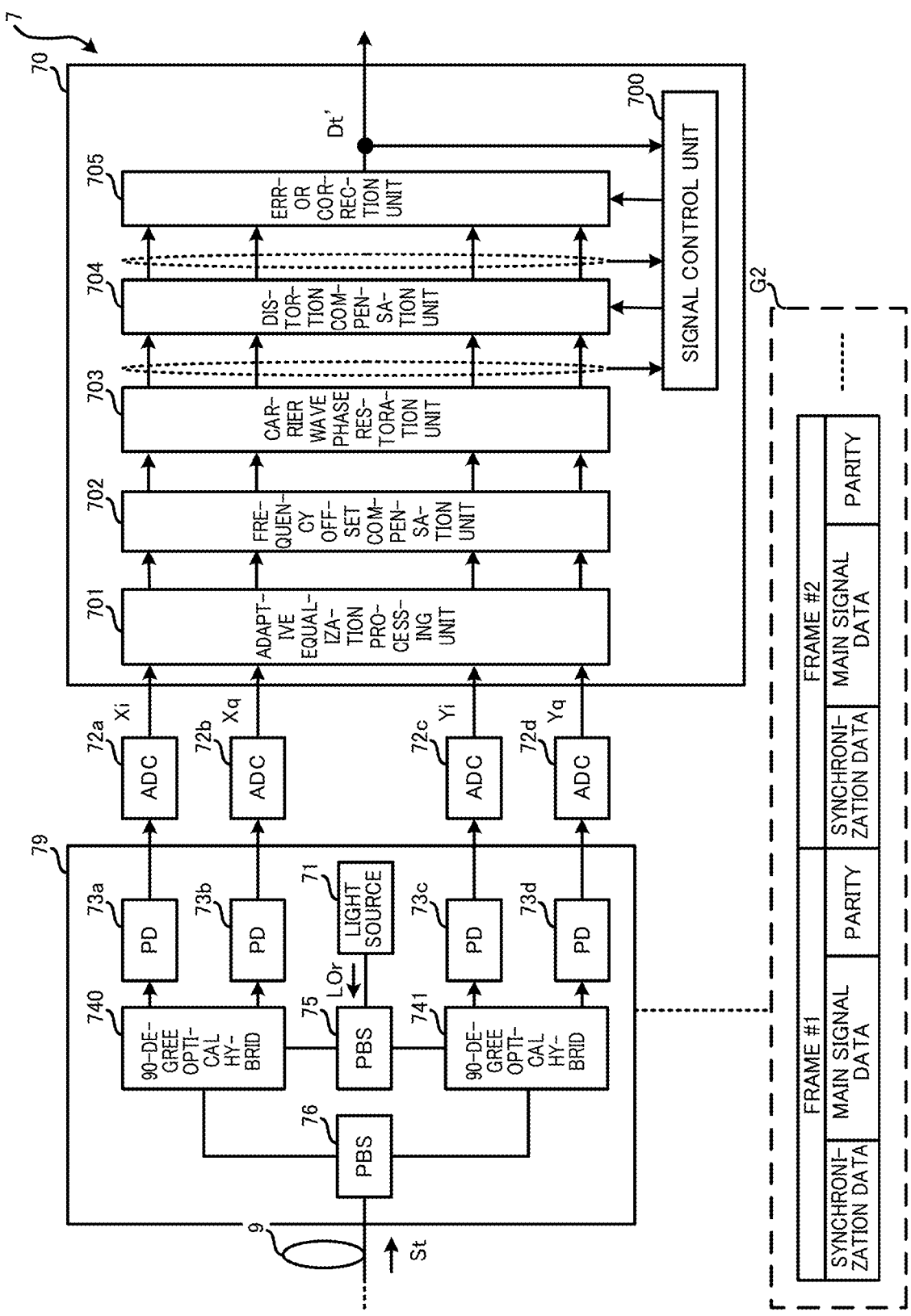
FIG. 2 is a block diagram illustrating an example of a reception device on a receiving side.

FIG. 2 is a block diagram illustrating an example of the reception device 7 on the receiving side. The reception device 7 receives the optical signal St from the transmission device 8 on the transmitting side. The processing of the reception device 7 described below is an example of a distortion compensation method for the frame signal.

The reception device 7 on the receiving side includes a reception processing circuit 70, ADCs (Analog-to-Digital Convertor) 72a to 72d, and a front-end unit 79. The front-end unit 79 is an example of a receiver that receives the frame signal. A code G2 indicates the configuration of the frame signal received by the front-end unit 79. The frame signal is the same as the frame signal transmitted from the transmission device 8 on the transmitting side.

The front-end unit 79 includes a light source 71, balance type photodiodes (PD: Photodiode) 73a to 73d, 90-degree optical hybrid circuits (90-degree optical hybrid) 740, 741, and PBSs 75, 76.

The PBS 76 separates the optical signal St into the X-polarized wave component and the Y-polarized wave component, and outputs them to the 90-degree optical hybrid circuits 740 and 741, respectively. The light source 71 is composed of a laser diode or the like, for example, and inputs local oscillation light LOr having a predetermined center frequency to the PBS 75. The PBS 75 separates the local oscillation light LOr into the X-polarized wave component and the Y-polarized wave component, and outputs them to the 90-degree optical hybrid circuits 740 and 741, respectively.

The 90-degree optical hybrid circuit 740 has a waveguide for interfering the X-polarized wave component of the optical signal St and the X-polarized wave component of the local oscillation light LOr, and detects the X-polarized wave component of the optical signal St. The 90-degree optical hybrid circuit 740 outputs optical components corresponding to the amplitude and the phase of the in-phase component and the orthogonal phase component to the PDs 73a and 73b, respectively, as a result of the detection.

The 90-degree optical hybrid circuit 741 has a waveguide for interfering the Y-polarized wave component of the optical signal St and the Y-polarized wave component of the local oscillation light LOr, and detects the Y-polarized wave component of the optical signal St. The 90-degree optical hybrid circuit 741 outputs optical components corresponding to the amplitude and phase of the in-phase component and the orthogonal phase component to the PDs 73c and 73d, respectively, as a result of the detection.

The PDs 73a to 73d convert the optical components input from the 90-degree optical hybrid circuits 740 and 741 into electric signals, and output the electric signals to the ADCs 72a to 72d, respectively. The ADCs 72a to 72d convert the electric signals input from the PDs 73a to 73d from analog signals to digital signals. This conversion yields the electric field signals Xi, Xq, Yi, and Yq. The electric field signals Xi, Xq, Yi, and Yq are output from the ADCs 72a to 72d to the reception processing circuit 70.

The reception processing circuit 70 includes a signal control unit 700, an adaptive equalization processing unit 701, a frequency offset compensation unit 702, a carrier wave phase restoration unit 703, a distortion compensation unit 704, and an error correction unit 705. An example of the reception processing circuit 70 includes the DSP. The reception processing circuit 70 is not limited to this, but may also be the FPGA, for example.

The adaptive equalization processing unit 701 performs adaptive equalization processing on the electric field signals Xi, Xq, Yi, and Yq. More specifically, the adaptive equalization processing unit 701 compensates for the waveform distortion of the optical signal St caused by polarization mode dispersion and polarization dependence loss that are generated on the transmission line 9 based on dynamic parameters. The adaptive equalization processing unit 701 outputs the electric field signals Xi, Xq, Yi, and Yq on which the adaptive equalization processing is performed, to the frequency offset compensation unit 702.

The frequency offset compensation unit 702 compensates for frequency differences and phase differences between the light source 71 and the carrier frequencies of the electric field signals Xi, Xq, Yi, Yq so that the electric field signals Xi, Xq, Yi, Yq are successfully demodulated by signal constellation (signal space diagram) according to a modulation system. The frequency offset compensation unit 702 outputs the electric field signals Xi, Xq, Yi, and Yq to the carrier wave phase restoration unit 703.

The carrier wave phase restoration unit 703 removes noise components from the electric field signals Xi, Xq, Yi, and Yq, estimates the correct carrier wave phases, and synchronizes the phases of the electric field signals Xi, Xq, Yi, and Yq with the estimated carrier wave phases. The carrier wave phase restoration unit 703 outputs the electric field signals Xi, Xq, Yi, and Yq to the distortion compensation unit 704 and the signal control unit 700.

The distortion compensation unit 704 compensates the electric field signals Xi, Xq, Yi, and Yq for the distortion generated by the transmission device 8 on the transmitting side. The distortion compensation unit 704 compensates for the signal distortion by a compensation circuit such as an FIR filter. At this time, the tap coefficient of the FIR filter is calculated and set by the signal control unit 700.

The distortion compensation unit 704 is an example of a compensation unit that compensates for distortion of the frame signal based on a compensation coefficient. The tap coefficient is an example of the compensation coefficient. The distortion compensation unit 704 outputs the electric field signals Xi, Xq, Yi, and Yq after distortions are compensated, to the error correction unit 705 and the signal control unit 700.

The error correction unit 705 demodulates the symbol data of the electric field signals Xi, Xq, Yi, and Yq to demap and reproduce the frame signal, and performs error correction of the frame signal based on the parity. The error correction unit 705 corrects the error at the timing of the error correction notified from the signal control unit 700. The error correction unit 705 reproduces a data signal Dt' from the main signal data in the frame signal and outputs the data signal Dt' to the signal control unit 700 and an unillustrated function unit in a subsequent stage. The data signal Dt' is an example of the frame signal after the error is corrected by the error correction unit 705.

Figure 3:
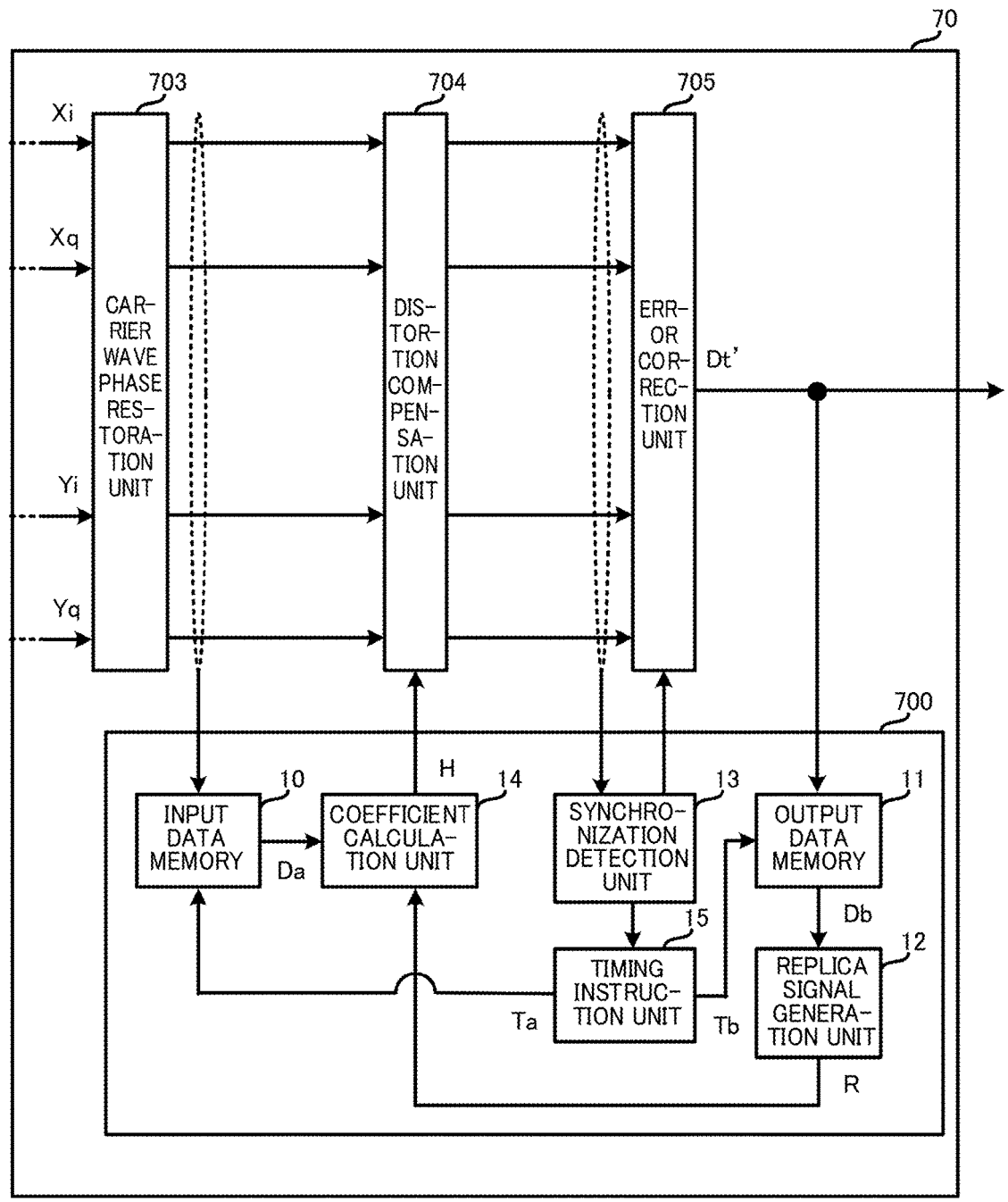
FIG. 3 is a block diagram illustrating an example of a signal control unit.

FIG. 3 is a block diagram illustrating an example of the signal control unit 700. The signal control unit 700 updates the tap coefficient of the distortion compensation unit 704 and notifies the error correction unit 705 of the timing of the error correction.

The signal control unit 700 includes an input data memory 10, an output data memory 11, a replica signal generation unit 12, a synchronization detection unit 13, a coefficient calculation unit 14, and a timing instruction unit 15. The electric field signals Xi, Xq, Yi, and Yq are input to the input data memory 10 from the carrier wave phase restoration unit 703. The input data memory 10 is an example of a first storage that stores a frame signal before the distortion is compensated by the distortion compensation unit 704.

The data signal Dt' after reproduction is input from the error correction unit 705 to the output data memory 11. The output data memory 11 is an example of a second storage that stores the frame signal after the error is corrected by the error correction unit 705.

The synchronization detection unit 13 detects the synchronization data in the frame signal from the electric field signals Xi, Xq, Yi, and Yq input from the distortion compensation unit 704. The synchronization detection unit 13 detects the synchronization data by reproducing the frame signal from the electric field signals Xi, Xq, Yi, Yq, for example, and collating a data pattern of the frame signal with a pattern of the synchronization data. The synchronization detection unit 13 is an example of a detector that detects synchronization timing of the frame signal from the synchronization data.

The synchronization detection unit 13 notifies the error correction unit 705 of timing of the error correction based on the timing at which the synchronization data is detected. The error correction unit 705 is an example of a corrector that corrects an error in the frame signal after the distortion is compensated, based on an error correction code according to the synchronization timing. For example, the error correction unit 705 detects the parity from the synchronization timing and uses it for the error correction. The synchronization detection unit 13 notifies the timing instruction unit 15 of the timing of the error correction.

The replica signal generation unit 12 reads data Db of the frame signal from the output data memory 11, and generates a replica signal R from the data Db. The replica signal generation unit 12 outputs the replica signal R to the coefficient calculation unit 14.

Figure 4:
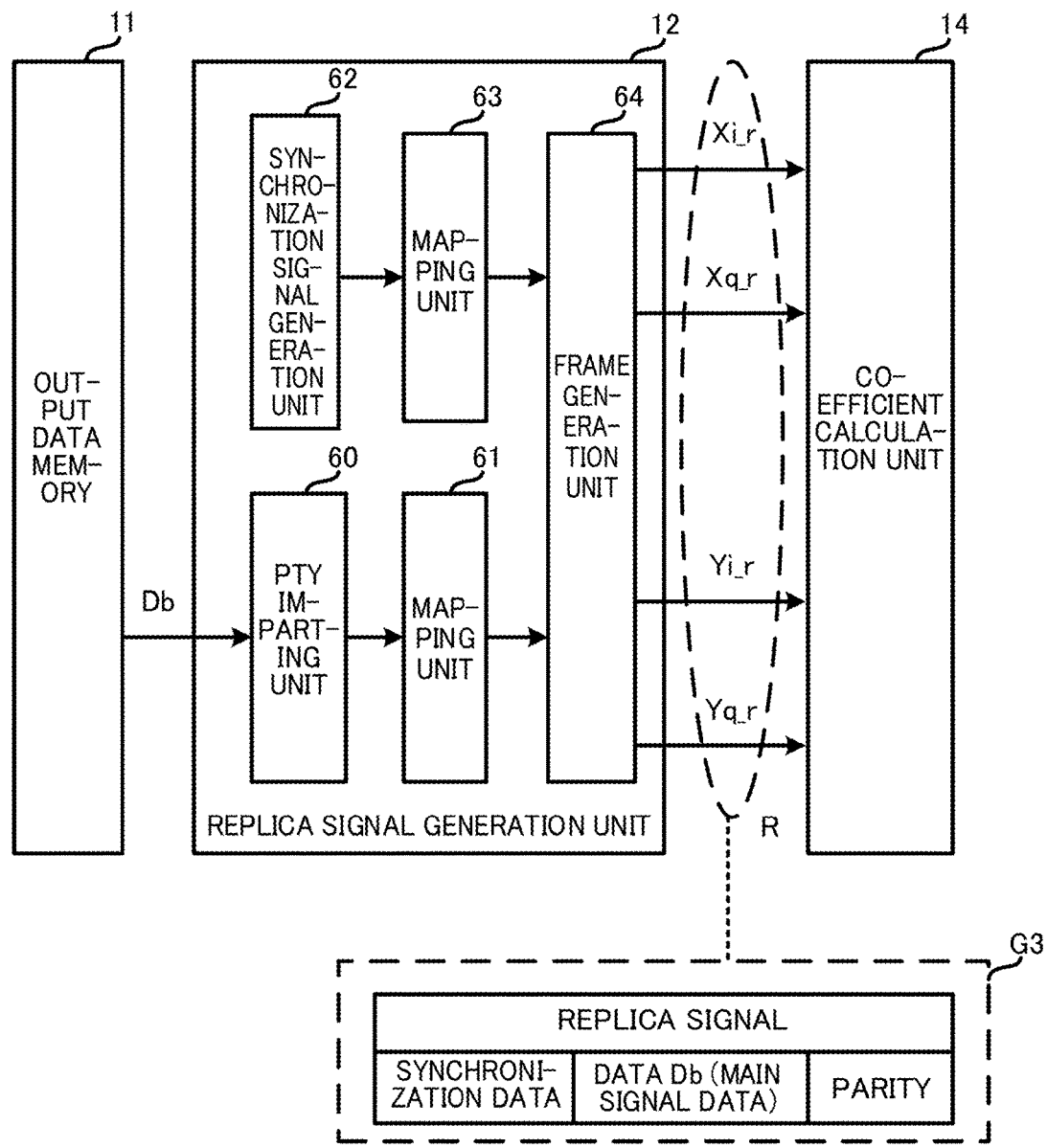
FIG. 4 is a block diagram illustrating an example of a replica signal generation unit.

FIG. 4 is a block diagram illustrating an example of the replica signal generation unit 12. The replica signal generation unit 12 reads the data Db of the frame signal from the output data memory 11, uses the data Db as the main signal data, and adds synchronization data and the parity to the data Db to generate the replica signal R.

The replica signal generation unit 12 is an example of a generator that generates a replica signal corresponding to the frame signal before the distortion is compensated, from the frame signal after the error is corrected by the error correction unit 705, based on the synchronization timing. The replica signal generation unit 12 includes a parity (PTY) imparting unit 60, mapping units 61 and 63, a synchronization signal generation unit 62, and a frame generation unit 64.

The synchronization signal generation unit 62 generates the synchronization data and outputs the synchronization data to the mapping unit 63. The mapping unit 63 maps the synchronization data to the symbol data according to the modulation system of QPSK, for example. The mapping unit 63 outputs the symbol data to the frame generation unit 64.

The PTY imparting unit 60 generates the parity from the data Db and imparts it to the data Db. The PTY imparting unit 60 outputs the data Db and the parity to the mapping unit 61.

The mapping unit 61 maps the data Db and the parity to the symbol data according to the modulation system of QAM, for example. The mapping unit 61 outputs the symbol data to the frame generation unit 64. The mapping unit 61 may use multi-level modulation different from the multi-level modulation of the mapping unit 63 of the synchronous data, or may use the same multi-level modulation as the multi-level modulation of the mapping unit 63 of the synchronous data.

The frame generation unit 64 generates the replica signal R from the symbol data input from each of the mapping units 61 and 63. A code G3 indicates an example of the configuration of the replica signal R. The replica signal R includes the synchronization data, the data Db which is the main signal data, and the parity. The frame generation unit 64 outputs the replica signal R to the coefficient calculation unit 14 as electric field signals Xi_r, Xq_r, Yi_r, Yq_r similar to the electric field signals Xi, Xq, Yi, Yq.

Referring to FIG. 3 again, the coefficient calculation unit 14 reads the data Da in the frame signal from the input data memory 10, calculates a tap coefficient H for the distortion compensation unit 704 from the data Da and the replica signal R, and sends it to the distortion compensation unit 704. The coefficient calculation unit 14 periodically calculates and updates the tap coefficient H. The coefficient calculation unit 14 is an example of an update processor that updates the compensation coefficient from the replica signal R and the frame signal before the distortion is compensated.

The timing instruction unit 15 instructs timings Ta and Tb for storing the frame signals in the input data memory 10 and the output data memory 11, respectively, according to the synchronization timing notified from the synchronization detection unit 13. The timing instruction unit 15 instructs the timings Ta and T by controlling whether to write by, for example, write enable of the input data memory 10 and the output data memory 11.

The output data memory 11 stores the reproduced data signal Dt' output from the error correction unit 705 at the timing Tb. The data of the data signal Dt' stored in the output data memory 11 is referred to as the data Db. The replica signal generation unit 12 reads the data Db from the output data memory 11, generates the replica signal R, and outputs the replica signal R to the coefficient calculation unit 14.

The input data memory 10 stores the data Da of the electric field signals Xi, Xq, Yi, and Yq output from the carrier wave phase restoration unit 703 to the distortion compensation unit 704 at the timing Ta. The coefficient calculation unit 14 reads the data Da from the input data memory 10 and uses the data Da together with the replica signal R to calculate the tap coefficient.

In this way, the timing instruction unit 15 instructs the timings Ta and Tb for storing the frame signals. Therefore, the replica signal generation unit 12 can generate the replica signal R corresponding to the frame signal before the distortion is compensated, from the frame signal after the error is corrected by the error correction unit 705, based on the synchronization timing.

Figure 5:
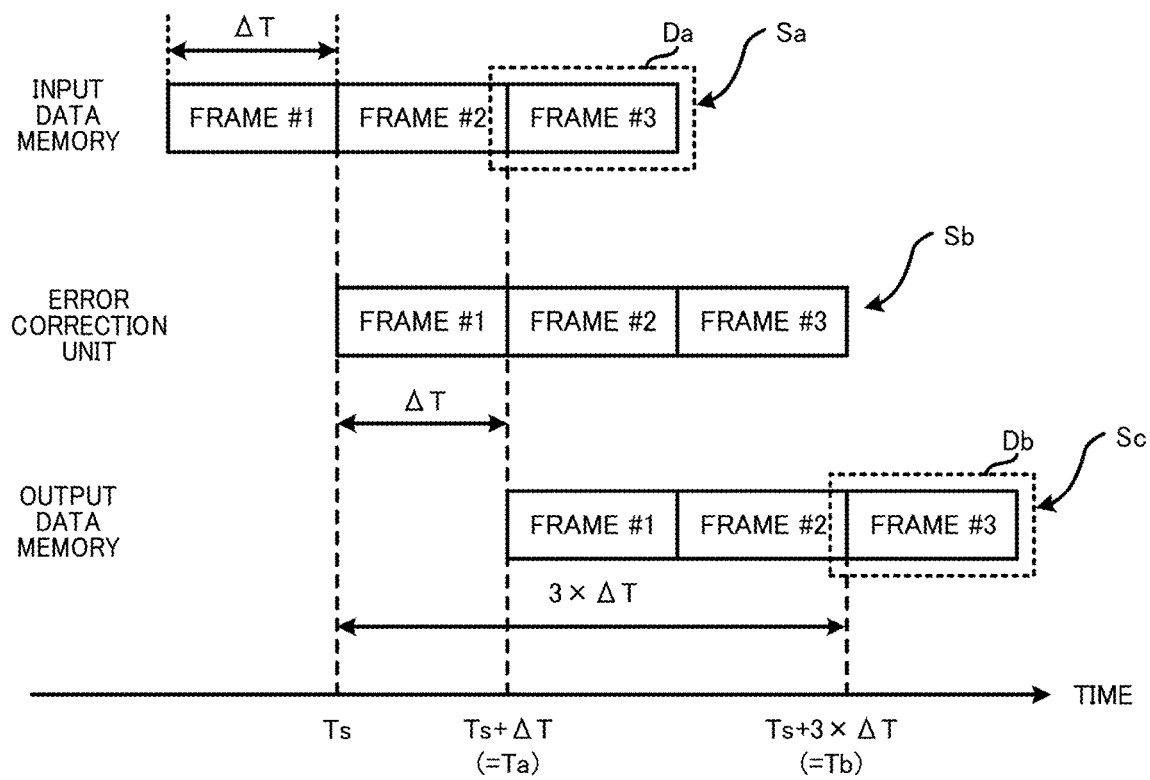
FIG. 5 is a time chart illustrating an example of timings for storing frame signals in an input data memory and an output data memory.

FIG. 5 is a time chart illustrating an example of the timings Ta and T for storing the frame signals in the input data memory 10 and the output data memory 11. A horizontal axis of FIG. 5 indicates a time.

A code Sa indicates an example of the frame signal input to the input data memory 10. A code Sb indicates an example of the frame signal input to the error correction unit 705. A code Sc indicates an example of the frame signal input to the output data memory 11.

The frame signal includes frames #1 to #3. It is assumed that the coefficient calculation unit 14 uses the data Da of the frame signal frame #3 indicated by the code Sa and the data Db of the frame signal frame #3 indicated by the code Sc to calculate the tap coefficient.

It is assumed that a delay time of the frame signal due to each processing of the distortion compensation unit 704 and the error correction unit 705 is a time $\Delta T$ for a single frame. Therefore, there is a time difference of $2 \times \Delta T$ between the frames #1 to #3 input to the input data memory 10 and the frames #1 to #3 input to the output data memory 11.

The synchronization detection unit 13 detects an input time Ts as the synchronization timing, from the pattern collation of the synchronization data of the frame #1 input to the error correction unit 705. The timing instruction unit 15 instructs the input data memory 10 and the output data memory 11 to store the data Da and Db in the input data memory 10 and the output data memory 11 at the timings Ta and Tb, respectively, using the input time Ts as a reference time.

Since the storage time of the frame #3 to the input data memory 10 is timing at which a time $\Delta T$ has elapsed from the input time Ts of the frame #1 input to the error correction unit 705, the storage time of the frame #3 is (Ts+$\Delta T$). The timing instruction unit 15 detects the storage time (Ts+$\Delta T$) of the frame #3 from the input time Ts using a timer circuit, for example, and notifies the input data memory 10 of the storage time (Ts+$\Delta T$) as timing Ta. The timing instruction unit 15 controls the input data memory 10 so that the frame signal can be stored for the time $\Delta T$ for the single frame.

Thereby, only the frame #3 among the frames #1 to #3 to be input to the input data memory 10 is stored in the input data memory 10. That is, only the frame #3 is stored in the input data memory 10. Therefore, the coefficient calculation unit 14 reads the frame #3 stored in the input data memory 10 as the data Da and uses it to calculate the tap coefficient.

Since the storage time of the frame #3 to the output data memory 11 is timing at which a time (3×ΔT) has elapsed from the input time Ts of the frame #1 input to the error correction unit 705, the storage time of the frame #3 is (Ts+3×ΔT). The timing instruction unit 15 detects the storage time (Ts+3×ΔT) of the frame #3 from the input time Ts using a timer circuit, for example, and notifies the output data memory 11 of the storage time (Ts+3×ΔT) as timing Tb. The timing instruction unit 15 controls the output data memory 11 so that the frame signal can be stored for the time ΔT for the single frame.

Thereby, only the frame #3 among the frames #1 to #3 to be input to the output data memory 11 is stored in the output data memory 11. That is, only the frame #3 is stored in the output data memory 11. Therefore, the replica signal generation unit 12 reads the frame #3 stored in the output data memory 11 as the data Db and uses it to generate the replica signal R.

In this way, the timing instruction unit 15 stores the frame signal in the input data memory 10 at the timing Ta whose reference is the synchronization timing of the frame signal, and stores the frame signal in the output data memory 11 at the timing Tb whose reference is the synchronization timing. Therefore, each of the input data memory 10 and the output data memory 11 may have a capacity of only a single frame which is used by the coefficient calculation unit 14 to calculate the tap coefficient, for example.

In contrast, if the transmission device 8 on the transmitting side imparts a compensation signal to the frame signal and the distortion compensation unit 704 compensates for the distortion of the frame signal using the compensation signal, the data amount of the compensation signal is less than that of the frame signal due to the limitation of a transmission band. Therefore, the transmission device 8 on the transmitting side needs to insert the compensation signal between a plurality of frame signals and other plurality of frame signals. Therefore, since the reception device 7 on the receiving side stores the compensation signals as a series of data in the memory without interruption, a memory having a large capacity equal to or larger than a sum of the data amount of the plurality of frame signals and twice the data amount of the compensation signal is required.

Therefore, according to the timing instruction unit 15, the memory capacity for storing the frame signal is reduced. The reception device 7 is not limited to the above-mentioned configuration. The reception device 7 may store frame signals for a predetermined number of frames in the input data memory 10 and the output data memory 11, and may search the same frames from the stored frame signals and use them to calculate the tap coefficient. The timing instruction unit 15 is an example of a storage processor. The timings Ta and Tb are examples of the first timing and the second timing whose references are the synchronization timing, respectively.

As described above, the replica signal generation unit 12 generates the replica signal R corresponding to the frame signal before the distortion is compensated based on the synchronization timing, from the frame signal after the error is corrected by the error correction unit 705. Therefore, the coefficient calculation unit 14 can calculate and update the tap coefficient from each of the frames #3 of the frame signal after the error is corrected by the error correction unit 705 and the frame signal before the distortion is compensated by the distortion compensation unit 704.

Figure 6A:
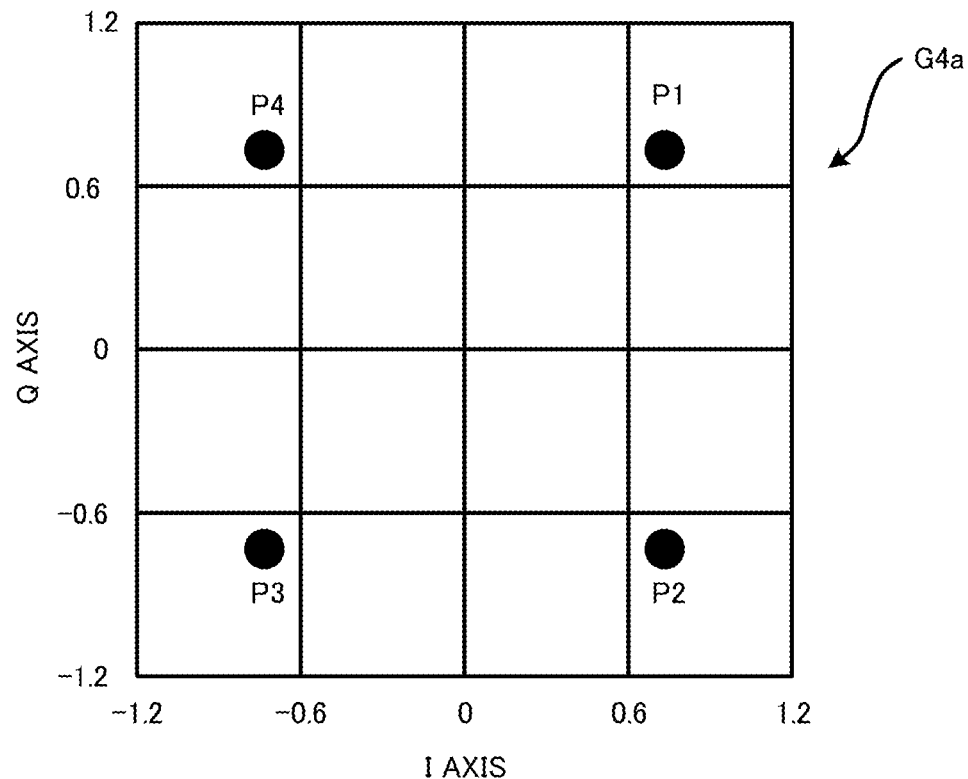
FIG. 6A is a diagram illustrating an example of symbols of a replica signal.
Figure 6B:
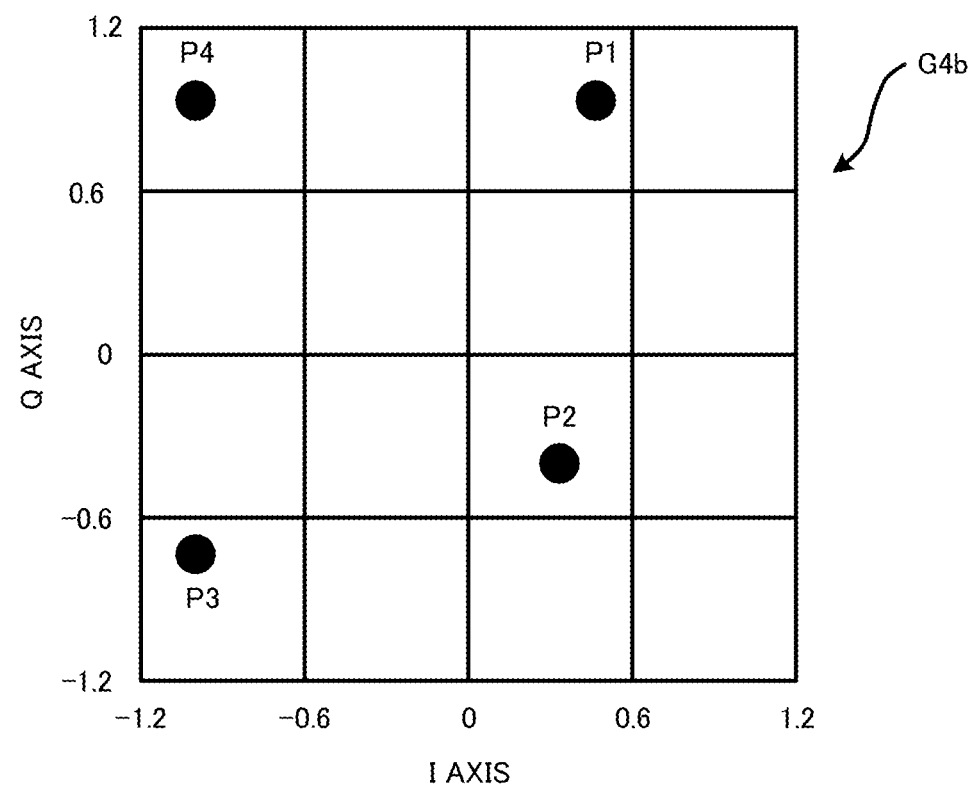
FIG. 6B is a diagram illustrating an example of symbols of a frame signal whose distortion is not compensated.

FIG. 6A is a diagram illustrating an example of symbols of the replica signal R, and FIG. 6B is a diagram illustrating an example of symbols of the frame signal whose distortion is not compensated. In this example, QPSK is used as the modulation system of the frame signal.

A code G4a indicates an example of the symbols of the replica signal R in the constellation, and a code G4b indicates an example of the symbols of the frame signal in the constellation. Symbols P1 to P4 in the respective constellations correspond to the same data values as each other.

Since the replica signal R is generated from the main signal data (data signal Dt') of the frame signal after the error correction by the error correction unit 705, the symbols P1 to P4 in the constellation of the code G4a are substantially evenly spaced from each other and are arranged at symmetrical coordinates centered on an origin (0,0).

For example, the coordinates of the symbol P1 are (0.7, 0.7) and the coordinates of the symbol P2 are (0.7, −0.7). The coordinates of the symbol P3 are (−0.7, −0.7) and the coordinates of the symbol P4 are (−0.7, 0.7).

On the other hand, the frame signal is compensated for distortion and the like generated in the transmission line 9 by each processing of the adaptive equalization processing unit 701, the frequency offset compensation unit 702, and the carrier wave phase restoration unit 703. However, since the compensation by the distortion compensation unit 704 and the error correction by the error correction unit 705 are not performed, the frame signal has the distortion caused by a modulator or the like in the transmission device 8 on the transmitting side. Therefore, each symbol in the constellation of the code G4b is arranged at coordinates deviating from substantially ideal coordinates such as symbols P1 to P4 of the replica signal R.

For example, the coordinates of the symbol P1 are (0.43, 0.89) and the coordinates of the symbol P2 are (0.4, −0.43). The coordinates of the symbol P3 are (−1.0, −0.78) and the coordinates of the symbol P4 are (−0.84, 0.98).

The coefficient calculation unit 14 is an optimum tap coefficient from the symbols P1 to P4 before the error correction which are deviated from the ideal coordinates in the constellation and the symbols P1 to P4 of the replica signal R having the ideal coordinates in the constellation.

Therefore, the coefficient calculation unit 14 does not need to receive a distortion compensation signal from the transmission device 8 on the transmitting side separately from the frame signal and use the distortion compensation signal to calculate the tap coefficient. Therefore, the reception device 7 can compensate for the distortion of the frame signal to which the distortion compensation signal is not imparted.

(Example of Configuration of Distortion Compensation Unit 704)

Figure 7:
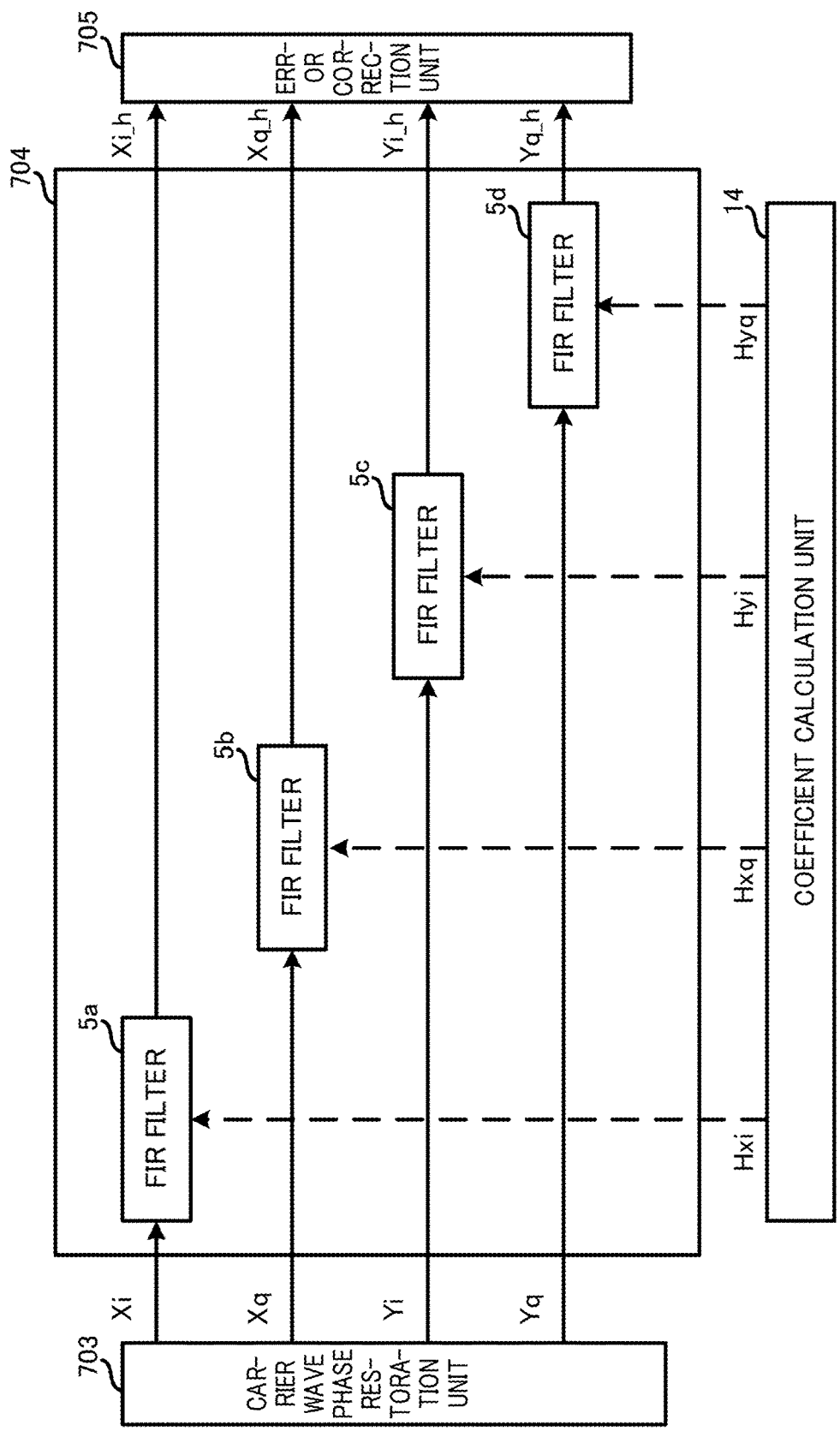
FIG. 7 is a block diagram illustrating an example of a distortion compensation unit.

FIG. 7 is a block diagram illustrating an example of the distortion compensation unit 704. The distortion compensation unit 704 has a 1×4 equalizer as an example. In the 1×4 equalizer, a single input signal is used to calculate each of four output signals.

The distortion compensation unit 704 has FIR filters 5a-5d for the electric field signals Xi, Xq, Yi, and Yq. The electric field signals Xi, Xq, Yi, and Yq output from the carrier wave phase restoration unit 703 pass through the FIR filters 5a to 5d, respectively, and are input to the error correction unit 705 as electric field signals Xi_h, Xq_h, Yi_h, and Yq_h in which distortions are corrected (hereinafter referred to as "compensated electric field signals"), respectively. Tap coefficients Hxi, Hxq, Hyi, and Hyq are set in the FIR filters 5a to 5d by the coefficient calculation unit 14, respectively.

(Formula 1)

$$\begin{pmatrix} Xi\_h \\ Xq\_h \\ Yi\_h \\ Yq\_h \end{pmatrix} = \begin{pmatrix} Hxi & 0 & 0 & 0 \\ 0 & Hxq & 0 & 0 \\ 0 & 0 & Hyi & 0 \\ 0 & 0 & 0 & Hyq \end{pmatrix} \begin{pmatrix} Xi \\ Xq \\ Yi \\ Yq \end{pmatrix} \quad (1)$$

The compensation processing performed by the distortion compensation unit 704 is represented by the above-mentioned formula (1), for example. The compensated electric field signals Xi_h, Xq_h, Yi_h and Yq_h are calculated as the product of the electric field signals Xi, Xq, Yi and Yq and the tap coefficients Hxi, Hxq, Hyi and Hyq, respectively. That is, each of the compensated electric field signals Xi_h, Xq_h, Yi_h and Yq_h, which are the output signals, is calculated from one of the electric field signals Xi, Xq, Yi and Yq which are the input signals.

Figure 8:
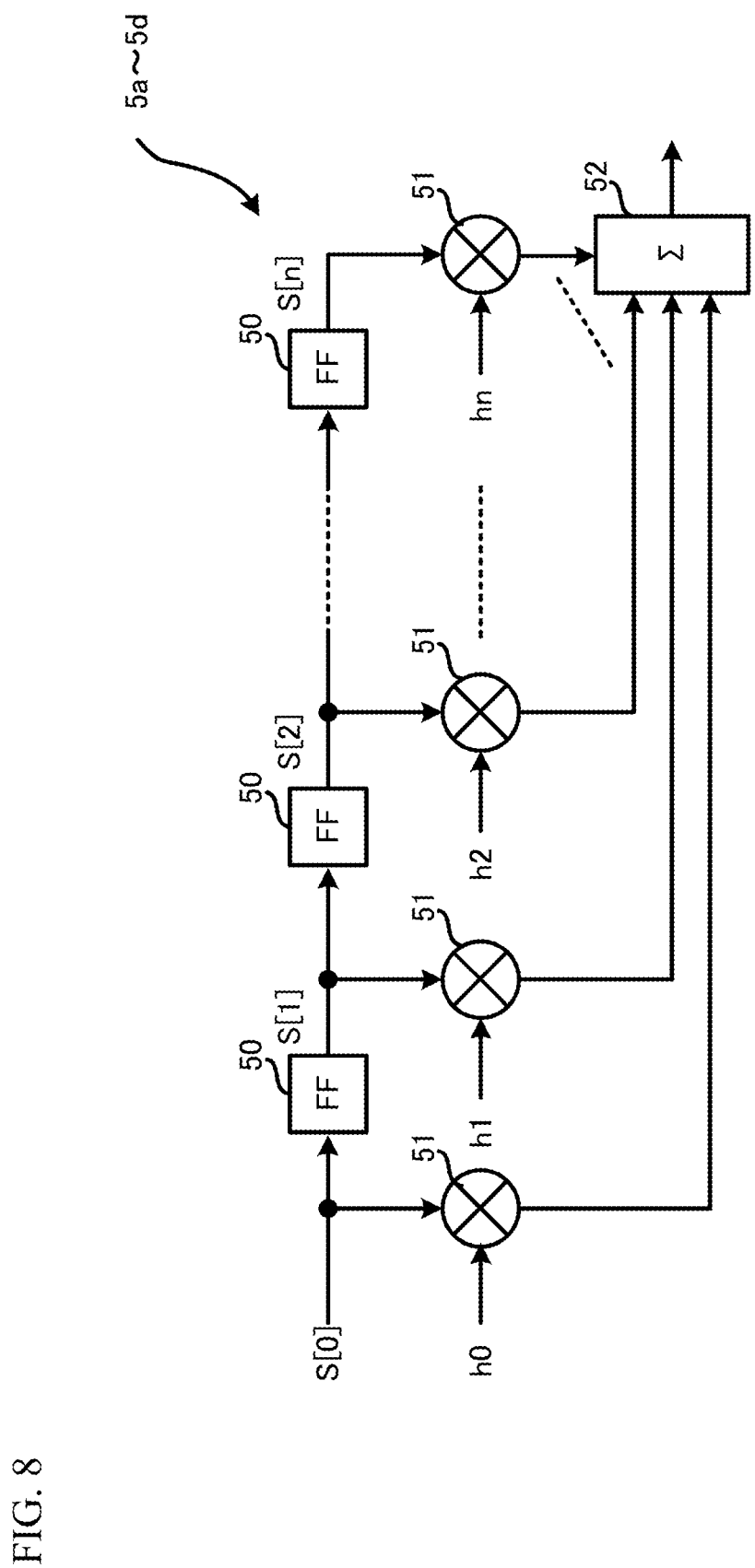
FIG. 8 is a block diagram illustrating an example of FIR filters.

FIG. 8 is a block diagram illustrating an example of the FIR filters 5a to 5d. The FIR filters 5a to 5d include a plurality of flip-flops (FF) 50, a plurality of multipliers 51, and an adder (Σ) 52. The FF 50 and the multiplier 51 are provided for the number of taps.

The plurality of FFs 50 sequentially delays the signals S[0] (i.e., the electric field signals Xi, Xq, Yi and Yq) input from the carrier wave phase restoration unit 703 in a previous stage, so that the FIR filters 5a to 5d generate signals S[1] to S[n] (n: positive integers). In the FIR filters 5a to 5d, the multipliers 51 multiply the signals S [0] to S [n] by the tap coefficients h0 to hn, and the adder 52 sums the output values from the respective multipliers 51 to output a summed value to the error correction unit 705. The tap coefficients h0 to hn of the FIR filters 5a to 5d are typically represented by the tap coefficients Hxi, Hxq, Hyi and Hyq (H).

The coefficient calculation unit 14 calculates the tap coefficients Hxi, Hxq, Hyi and Hyq by a minimum mean square error method (MMSE) or a least mean square method (LMS), for example.

(Example of Configuration of Coefficient Calculation Unit 14 Using Minimum Mean Square Error Method)

Figure 9:
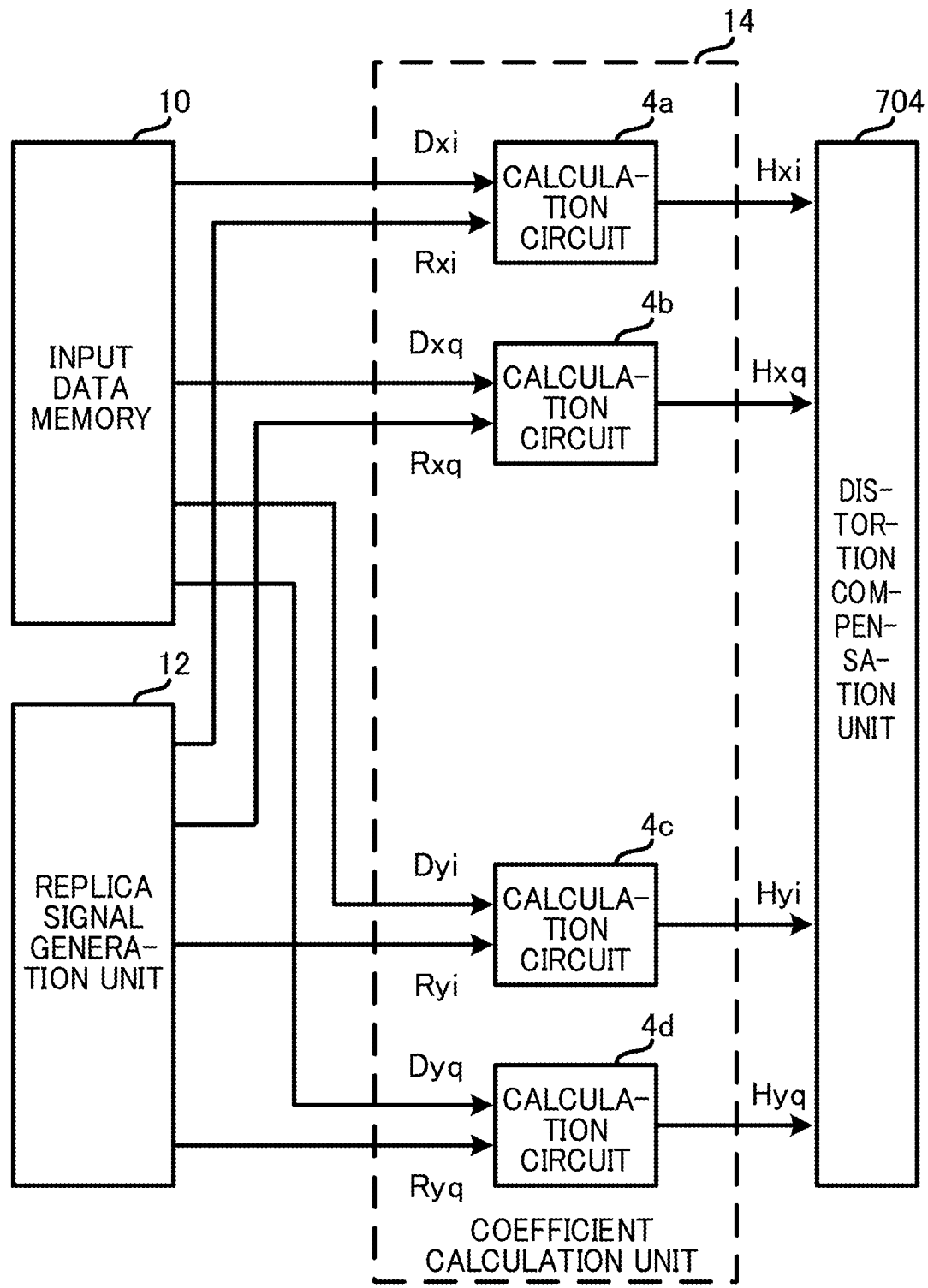
FIG. 9 is a block diagram illustrating an example of a coefficient calculation unit using a minimum mean square error method.

FIG. 9 is a block diagram illustrating an example of the coefficient calculation unit 14 using the minimum mean square error method. The coefficient calculation unit 14 includes calculation circuits 4a to 4d.

The calculation circuit 4a calculates the tap coefficient Hxi (h0 to hn) of the electric field signal Xi from data Dxi read from the input data memory 10 and a replica signal Rxi input from the replica signal generation unit 12. The calculation circuit 4b calculates the tap coefficient Hxq (h0 to hn) of the electric field signal Xq from data Dxq read from the input data memory 10 and a replica signal Rxq input from the replica signal generation unit 12.

The calculation circuit 4c calculates the tap coefficient Hyi (h0 to hn) of the electric field signal Yi from data Dyi read from the input data memory 10 and a replica signal Ryi input from the replica signal generation unit 12. The calculation circuit 4d calculates the tap coefficient Hyq (h0 to hn) of the electric field signal Yq from data Dyq read from the input data memory 10 and a replica signal Ryq input from the replica signal generation unit 12.

The calculation circuits 4a to 4d periodically calculate the tap coefficients Hxi, Hxq, Hyi and Hyq, respectively, and set them to the distortion compensation unit 704 to update the tap coefficients Hxi, Hxq, Hyi and Hyq. Here, the data Dxi, Dxq, Dyi and Dyq are typically represented by the data Da, and the replica signals Rxi, Rxq, Ryi and Ryq are typically represented by the replica signal R.

The calculation circuits 4a to 4d calculate the tap coefficients Hxi, Hxq, Hyi and Hyq, respectively, by the minimum mean square error method, for example. An example of calculation processing is given below.

(Formulae 2 and 3)

$$(h0 \; h1 \; \ldots \; hn)^T = (Da^H \; Da)^{-1}(Da^H \; R) \quad (2)$$

$$R^T = (r_n \; r_{n+1} \; \ldots \; r_{L-1}) \quad (3)$$

(Formula 4)

$$Da = \begin{pmatrix} d_n & d_{n-1} & \ldots & d_0 \\ d_{n+1} & d_n & \ldots & d_1 \\ \vdots & \vdots & \ddots & \vdots \\ d_{L-1} & d_{L-2} & \ldots & d_{L-n-1} \end{pmatrix} \quad (4)$$

The tap coefficients h0 to hn of each of the electric field signals Xi, Xq, Yi and Yq are calculated by a matrix calculation formula of the above-mentioned formula (2). In the formula (2), a subscript "T" represents a transposed matrix and a subscript "H" represents a Hermitian matrix.

The replica signal R in the formula (2) is a matrix represented by the above-mentioned formula (3). Data $r_n$, $r_{n+1}, \ldots, R_{L-1}$ are data included in each of the electric field signals Xi_r, Xq_r, Yi_r and Yq_r included in the replica signal R. Here, a subscript "n" is the number of taps of the FIR filters 5a to 5d, and a subscript "L" is a signal length of the data Da used when the minimum mean square error method is applied.

The data Da in the formula (2) is a matrix represented by the above-mentioned formula (4). Data $d_0, d_1, \ldots, d_{L-1}$ are data of each of the electric field signals Xi, Xq, Yi and Yq. The subscripts "n" and "L" are the same as those described above.

Each of the calculation circuits 4a to 4d calculates the tap coefficients h0 to hn for each of the electric field signals Xi, Xq, Yi and Yq using the formulae (2) to (4). For example, in the calculation of the tap coefficients h0 to hn (Hxi) of the electric field signal Xi, the electric field signal Xi included in the data Da and the electric field signal Xi_r included in the replica signal R are used. In the calculation of the tap coefficients h0 to hn (Hyq) of the electric field signal Yq, the electric field signal Yq included in the data Da and the electric field signal Yq_r included in the replica signal R are used.

The coefficient calculation unit 14 periodically calculates the tap coefficients h0 to hn and sets them to the FIR filters 5a to 5d. Thereby, the tap coefficients h0 to hn are updated.

(Example of Configuration of Coefficient Calculation Unit 14 Using Least Mean Square Method)

Figure 10:
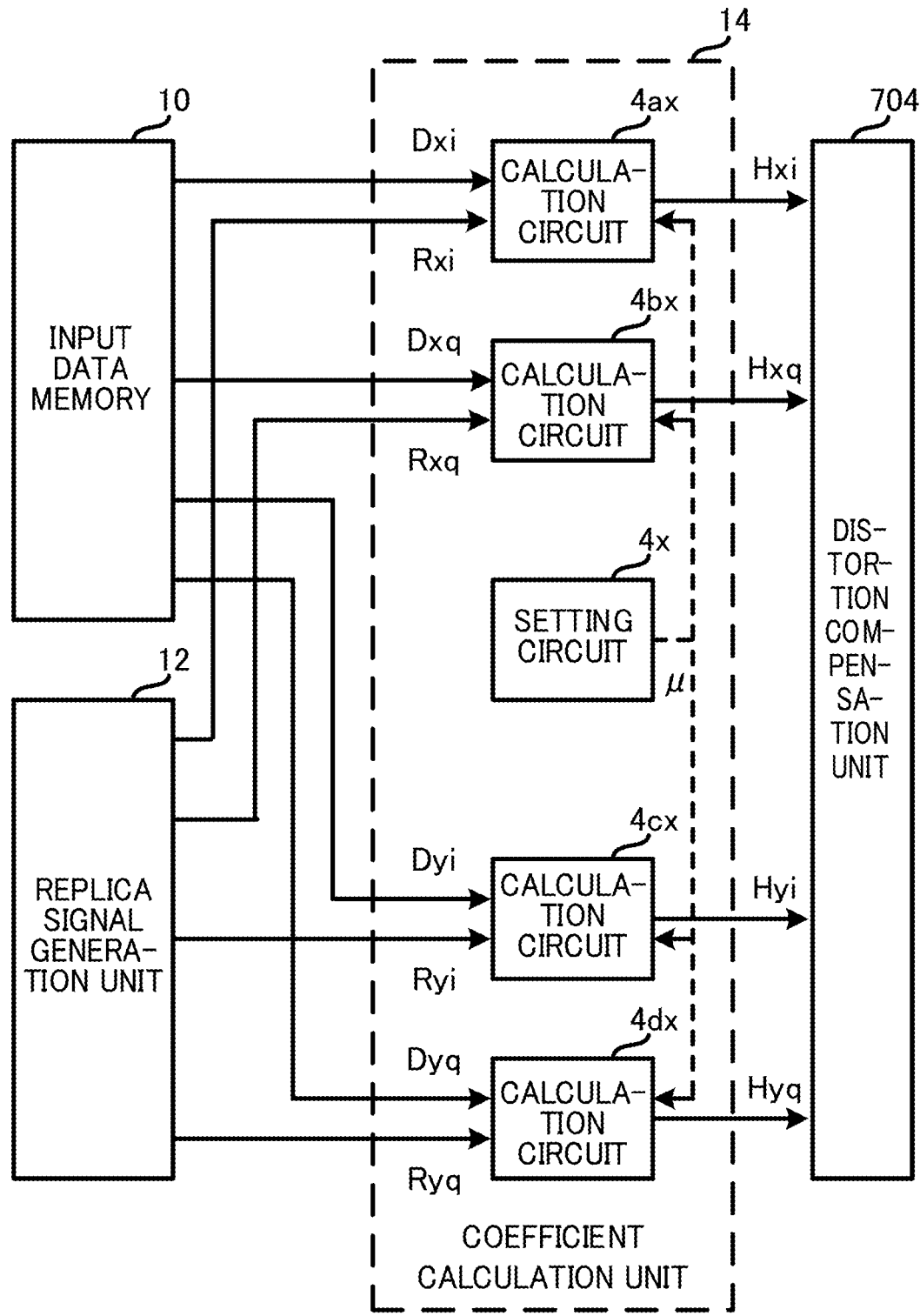
FIG. 10 is a block diagram illustrating an example of a coefficient calculation unit using a least mean square method.

FIG. 10 is a block diagram illustrating an example of the coefficient calculation unit 14 using the least mean square method. The coefficient calculation unit 14 includes calculation circuits 4ax to 4dx and a setting circuit 4x.

The calculation circuits 4ax to 4dx read data Dxi, Dxq, Dyi and Dyq from the input data memory 10, respectively, in the same manner as the calculation circuits 4a to 4d. The replica signals Rxi, Rxq, Ryi and Ryq are input to the calculation circuits 4ax to 4dx from the replica signal generation unit 12, respectively, in the same manner as the calculation circuits 4a to 4d. The setting circuit 4x sets a step size μ to the calculation circuits 4ax to 4dx.

The calculation circuits 4ax to 4dx calculate the tap coefficients Hxi, Hxq, Hyi and Hyq by applying the least mean square method to the data Dxi, Dxq, Dyi and Dyq and the replica signals Rxi, Rxq, Ryi and Ryq, respectively. The calculation circuits 4ax to 4dx calculate the tap coefficients Hxi, Hxq, Hyi and Hyq at a time (k+1) of the next calculation processing, respectively, based on the tap coefficients Hxi, Hxq, Hyi and Hyq at a time k (integer) obtained in the previous calculation processing and the step size μ. An example of the calculation processing is given below.

(Formulae 5 to 8)

$$(h0[k+1]\ h1[k+1]\ \ldots\ hn[k+1])^T = (h0[k]\ h1[k]\ \ldots\ hn[k])^T + \mu \cdot e[k]Da^*[k] \quad (5)$$

$$e[k] = R[k] - (h0[k]h1[k]\ \ldots\ hn[k])Da[k] \quad (6)$$

$$R[k] = r[k] \quad (7)$$

$$Da[k]^T = (d[k]d[k-1]\ \ldots\ d[k-n]) \quad (8)$$

The tap coefficients h0 to hn of each of the electric field signals Xi, Xq, Yi and Yq are calculated by a matrix calculation formula of the above-mentioned formula (5). In the formula (5), the tap coefficients h0 [k+1] to hn [k+1] are the tap coefficients h0 to hn at the time (k+1), and the tap coefficients h0 [k] to hn [k] are the tap coefficients h0 to hn at the time k. The subscript "T" represents a transposed matrix, and the code "*" represents a complex conjugate matrix.

An e [k] is calculated by the above-mentioned formula (6). In the formula (6), the replica signal R [k] is data r [k] included in each of the electric field signals Xi_r, Xq_r, Yi_r and Yq_r at a time k, as illustrated in the above-mentioned formula (7).

The data Da [k] in the formula (6) is a matrix represented by the above-mentioned formula (8). The data d [k], d [k−1], . . . , D [kn] are data of each of the electric field signals Xi, Xq, Yi and Yq at the time k. The subscript "n" is the same as that described above.

Each of the calculation circuits 4ax to 4dx calculates the tap coefficients h0 to hn at the time (k+1) for each of the electric field signals Xi, Xq, Yi and Yq using the formulae (5) to (8). For example, the tap coefficients h0 to hn of the electric field signal Xi at the time k calculated at a previous time, the electric field signal Xi included in the data Da, and the electric field signal Xi_r included in the replica signal R are used to calculate the tap coefficients h0 to hn (Hxi) of the electric field signal Xi. Further, the tap coefficients h0 to hn of the electric field signal Yq at the time k calculated at a previous time, the electric field signal Yq included in the data Da, and the electric field signal Yq_r included in the replica signal R are used to calculate the tap coefficients h0 to hn (Hyq) of the electric field signal Yq.

Thus, the coefficient calculation unit 14 updates the tap coefficients h0 to hn based on the tap coefficients h0 to hn before the update, the replica signal R, and the frame signal before the distortion is compensated. Therefore, the coefficient calculation unit 14 can suppress amounts of fluctuation of the tap coefficients h0 to hn at the time of update, as compared with the case of using the minimum mean square error method.

(Example of Another Configuration of Distortion Compensation Unit 704)

Figure 11:
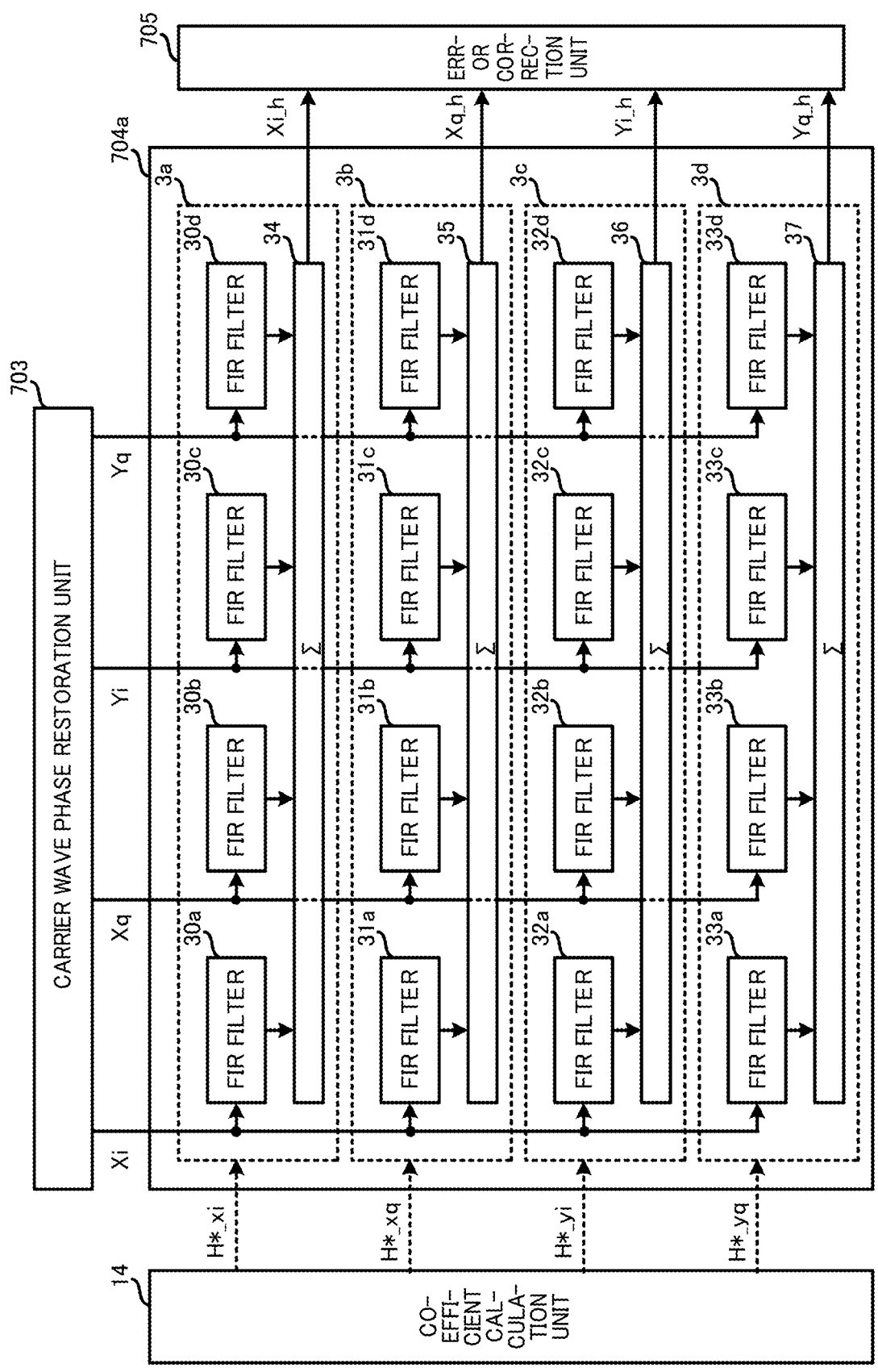
FIG. 11 is a block diagram illustrating another example of the distortion compensation unit.

FIG. 11 is a block diagram illustrating another example of the distortion compensation unit 704. A distortion compensation unit 704a has a 4×4 equalizer as an example. In the 4×4 equalizer, a single input signal is used to calculate each of four output signals.

The distortion compensation unit 704a has filter circuits 3a-3d for tap coefficients H*_xi, H*_xq, H*_yi and H*_yq (*: xi, xq, yi and yq). A filter circuit 3a has FIR filters 30a to 30d and an adder (Σ) 34, and a filter circuit 3b has FIR filters 31a to 31d and an adder 35. A filter circuit 3c has FIR filters 32a to 32d and an adder (E) 36, and a filter circuit 3d has FIR filters 33a to 33d and an adder 37. Each set of the FIR filters 30a to 30d, the FIR filters 31a to 31d, the FIR filters 32a to 32d and the FIR filters 33a to 33d has the same configuration as a set of the FIR filters 5a to 5d, as illustrated in FIG. 8.

The electric field signals Xi, Xq, Yi and Yq are input from the carrier wave phase restoration unit 703 to each of the filter circuits 3a to 3d. The electric field signal Xi is input to the FIR filters 30a to 33a, and the electric field signal Xq is input to the FIR filters 30b to 33b. The electric field signal Yi is input to the FIR filters 30c to 33c, and the electric field signal Yq is input to the FIR filters 30d to 33d.

The coefficient calculation unit 14 sets tap coefficients Hxi_xi, Hxq_xi, Hyi_xi and Hyq_xi to the FIR filters 30a to 30d, respectively, and sets tap coefficients Hxi_xq, Hxq_xq, Hyi_xq and Hyq_xq in the FIR filters 31a to 31d, respectively. The coefficient calculation unit 14 sets tap coefficients Hxi_yi, Hxq_yi, Hyi_yi and Hyq_yi to the FIR filters 32a to 32d, respectively, and sets tap coefficients Hxi_yq, Hxq_yq, Hyi_yq and Hyq_jq in the FIR filters 33a to 33d, respectively.

The adder 34 generates an electric field signal Xi_h by adding the electric field signals Xi, Xq, Yi and Yq that have passed through the FIR filters 30a to 30d, respectively, and outputs the electric field signal Xi_h to the error correction unit 705. Thereby, the distortion of the I component of the X-polarized wave in the frame signal is compensated.

The adder 35 generates an electric field signal Xq_h by adding the electric field signals Xi, Xq, Yi and Yq that have passed through the FIR filters 31a to 31d, respectively, and outputs the electric field signal Xq_h to the error correction unit 705. Thereby, the distortion of the Q component of the Y-polarized wave in the frame signal is compensated.

The adder 36 generates an electric field signal Yi_h by adding the electric field signals Xi, Xq, Yi and Yq that have passed through the FIR filters 32a to 32d, respectively, and outputs the electric field signal Yi_h to the error correction unit 705. Thereby, the distortion of the I component of the Y-polarized wave in the frame signal is compensated.

The adder 37 generates an electric field signal Yq_h by adding the electric field signals Xi, Xq, Yi and Yq that have passed through the FIR filters 33a to 33d, respectively, and outputs the electric field signal Yq_h to the error correction unit 705. Thereby, the distortion of the Q component of the Y-polarized wave in the frame signal is compensated.

(Formula 9)

$$\begin{pmatrix} Xi\_h \\ Xq\_h \\ Yi\_h \\ Yq\_h \end{pmatrix} = \begin{pmatrix} Hxi\_xi & Hxq\_xi & Hyi\_xi & Hyq\_xi \\ Hxi\_xq & Hxq\_xq & Hyi\_xq & Hyq\_xq \\ Hxi\_yi & Hxq\_yi & Hyi\_yi & Hyq\_yi \\ Hxi\_yq & Hxq\_yq & Hyi\_yq & Hyq\_yq \end{pmatrix} \begin{pmatrix} Xi \\ Xq \\ Yi \\ Yq \end{pmatrix} \quad (9)$$

The compensation processing performed by the distortion compensation unit 704a is represented by the above-mentioned formula (9), for example. The compensated electric field signal Xi_h is calculated as the product of the electric field signals Xi, Xq, Yi and Yq and the tap coefficients Hxi_xi, Hxq_xi, Hyi_xi and Hyq_xi, respectively. The compensated electric field signal Xq_h is calculated as the product of the electric field signals Xi, Xq, Yi and Yq and the tap coefficients Hxi_xq, Hxq_xq, Hyi_xq and Hyq_xq, respectively.

The compensated electric field signal Yi_h is calculated as the product of the electric field signals Xi, Xq, Yi and Yq and the tap coefficients Hxi_yi, Hxq_yi, Hyi_yi an d Hyq_yi, respectively. The compensated electric field signal Yq_h is calculated as the product of the electric field signals Xi, Xq, Yi and Yq and the tap coefficients Hxi_yq, Hxq_yq, Hyi_yq and Hyq_yq, respectively. In this way, each of the compensated electric field signals Xi_h, Xq_h, Yi_h and Yq_h, which are the output signals, is calculated from the electric field signals Xi, Xq, Yi and Yq which are the four input signals.

The coefficient calculation unit 14 calculates the tap coefficients H*_xi, H*_xq, H*_yi and H*_yq (*: xi, xq, yi and yq) by the minimum mean square error method or the least mean square method, for example. For example, the tap coefficient Hxi_xi is a coefficient for compensating for distortion in the electric field signal Xi, and the tap coefficients Hxq_xi, Hyi_xi and Hyq_xi are coefficients for compensating for distortion due to the influence of the electric field signals Xq, Yi and Yq on the electric field signal Xi.

(Another Example of Configuration of Coefficient Calculation Unit 14 Using Minimum Mean Square Error Method)

Figure 12:
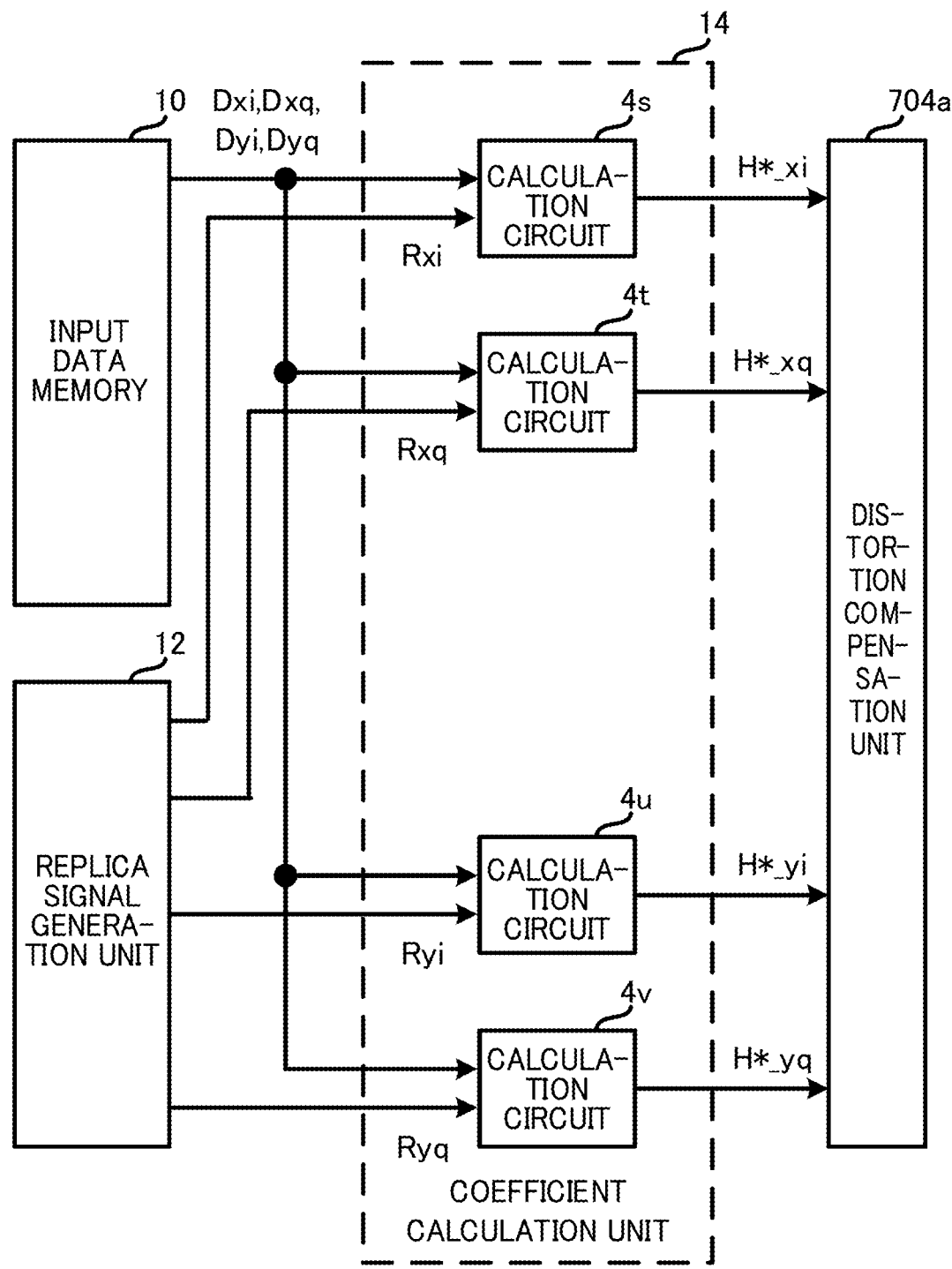
FIG. 12 is a block diagram illustrating another example of the coefficient calculation unit using the minimum mean square error method.

FIG. 12 is a block diagram illustrating another example of the coefficient calculation unit 14 using the minimum mean square error method. The coefficient calculation unit 14 includes calculation circuits 4s to 4v.

The calculation circuit 4s calculates a tap coefficient H*_xi (h0 to hn) of the electric field signal Xi from the data Dxi, Dxq, Dyi and Dyq read from the input data memory 10 and the replica signal Rxi input from the replica signal generation unit 12. A calculation circuit 4t calculates a tap coefficient H*_xq (h0 to hn) of the electric field signal Xq from the data Dxi, Dxq, Dyi and Dyq read from the input data memory 10 and the replica signal Rxq input from the replica signal generation unit 12.

A calculation circuit 4u calculates a tap coefficient H*_yi (h0 to hn) of the electric field signal Yi from the data Dxi, Dxq, Dyi and Dyq read from the input data memory 10 and the replica signal Ryi input from the replica signal generation unit 12. The calculation circuit 4v calculates a tap coefficient H*_yq (h0 to hn) of the electric field signal Yq from the data Dxi, Dxq, Dyi and Dyq read from the input data memory 10 and the replica signal Ryq input from the replica signal generation unit 12.

The calculation circuits 4s to 4v periodically calculate the tap coefficients H*_xi, H*_xq, H*_yi and H*_yq, respectively, and set them to the distortion compensation unit 704a, thereby performing update processing of the tap coefficients H*_xi, H*_xq, H*_yi and H*_yq.

(Formulae 10 to 13)

$$H^*\_xi = (Hxi\_xi \; Hxq\_xi \; Hyi\_xi \; Hyq\_xi)^T \qquad (10)$$

$$H^*\_xq = (Hxi\_xq \; Hxq\_xq \; Hyi\_xq \; Hyq\_xq)^T \qquad (11)$$

$$H^*\_yi = (Hxi\_yi \; Hxq\_yi \; Hyi\_yi \; Hyq\_yi)^T \qquad (12)$$

$$H^*\_yq = (Hxi\_yq \; Hxq\_yq \; Hyi\_yq \; Hyq\_yq)^T \qquad (13)$$

Hereinafter, a calculation example of the tap coefficients H*_xi, H*_xq, H*_yi and H*_yq is described. The tap coefficients H*_xi, H*_xq, H*_yi and H*_yq are represented by the above-mentioned formulae (10) to (13). For example, the tap coefficient H*_xi of the electric field signal Xi is considered as an example, the tap coefficients Hxi_xi, Hxq_xi, Hyi_xi and Hyq_xi are set to the FIR filters 30a to 30d, respectively.

(Formulae 14 to 17)

$$Hxi\_xi = (h0xi\_xi \; h1xi\_xi \; h2xi\_xi \ldots hnx1\_xi) \qquad (14)$$

$$Hxq\_xi = (h0xq\_xi \; h1xq\_xi \; h2xq\_xi \ldots hnxq\_xi) \qquad (15)$$

$$Hyi\_xi = (h0yi\_xi \; h1yi\_xi \; h2yi\_xi \ldots hnyi\_xi) \qquad (16)$$

$$Hyq\_xi = (h0yq\_xi \; h1yq\_xi \; h2yq\_xi \ldots hnyq\_xi) \qquad (17)$$

The tap coefficients Hxi_xi, Hxq_xi, Hyi_xi and Hyq_xi include tap coefficients h0*_* to hn*_* which are the tap coefficients h0 to hn of the FIR filters 30a to 30d, respectively, as illustrated by the above-mentioned formulae (14) to (17). Similarly to the tap coefficient H*_xi, the tap coefficients H*_xq, H*_yi and H*_yq of the other electric field signals Xq, Yi and Yq also include the tap coefficients h0 to hn of the sets of the FIR filters 31a to 31d, 32a to 32d, and 33a to 33d, respectively.

(Formulae 18 to 20)

$$H*\_xi = (Da^H Da)^{-1}(Da^H Rxi) \qquad (18)$$

$$Da = (Dxi \; Dxq \; Dyi \; Dyq) \qquad (19)$$

$$Rxi^T = (Rxi_L \; Rxi_{L+1} \ldots Rxi_{N-1}) \qquad (20)$$

(Formula 21)

$$D* = \begin{pmatrix} d*_n & d*_{n-1} & \ldots & d*_0 \\ d*_{n+1} & d*_n & \ldots & d*_1 \\ \vdots & \vdots & \ddots & \vdots \\ d*_{L-1} & d*_{L-2} & \ldots & d*_{L-n-1} \end{pmatrix} \qquad (21)$$

For example, the tap coefficient H*_xi of the electric field signal Xi is calculated from the data Da and the replica signal Rxi by the above-mentioned formula (18). The data Da includes the data Dxi, Dxq, Dyi and Dyq corresponding to the electric field signals Xi, Xq, Yi and Yq as illustrated by the above-mentioned formula (19).

The replica signal Rxi in the formula (18) is represented by the above-mentioned formula (20), and the data D*(Dxi, Dxq, Dyi, Dyq) in the formula (19) is represented by the above-mentioned formula (21). Here, the subscripts "n" and "L" are the same as those described above. The tap coefficients H*_xq, H*_yi and H*_yq of the other electric field signals Xq, Yi and Yq are also calculated by the same formulae used in the calculation of the tap coefficients H*_xi.

(Another Example of Configuration of Coefficient Calculation Unit 14 Using Least Mean Square Method)

Figure 13:
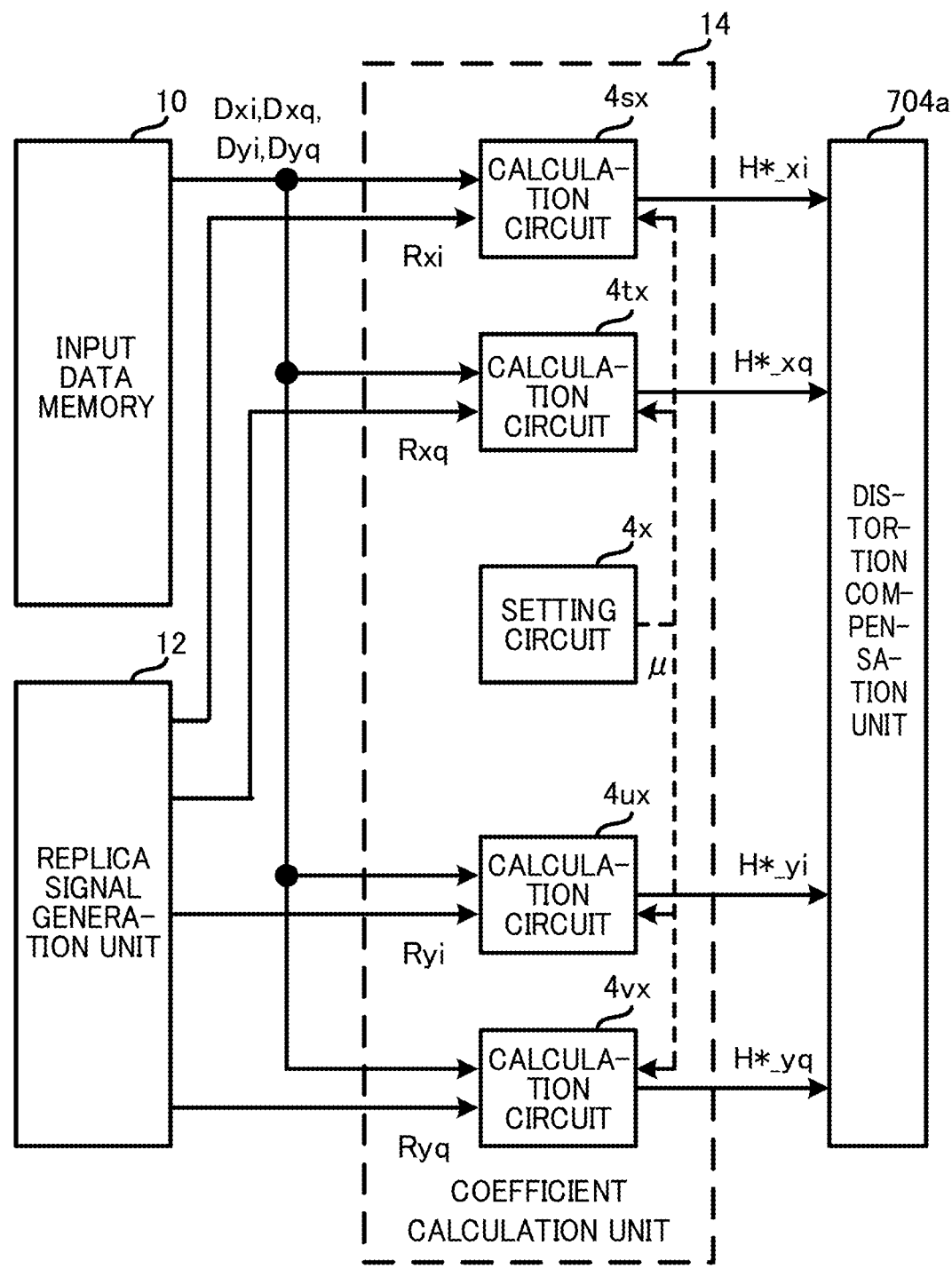
FIG. 13 is a block diagram illustrating another example of the coefficient calculation unit using the least mean square method.

FIG. 13 is a block diagram illustrating another example of the coefficient calculation unit 14 using the least mean square method. The coefficient calculation unit 14 includes calculation circuits 4sx to 4vx and the setting circuits 4x.

The calculation circuits 4sx to 4vx read data Dxi, Dxq, Dyi and Dyq from the input data memory 10 in the same manner as the calculation circuits 4s to 4v. The replica signals Rxi, Rxq, Ryi and Ryq are input to the calculation circuits 4sx to 4vx from the replica signal generation unit 12, respectively, in the same manner as the calculation circuits 4s to 4v. The setting circuit 4x sets the step size μ to the calculation circuits 4sx to 4vx.

The calculation circuits 4sx to 4vx calculate the tap coefficients H*_xi, H*_xq, H*_yi and H*_yq by applying the least mean square method to the data Dxi, Dxq, Dyi and Dyq and the replica signals Rxi, Rxq, Ryi and Ryq, respectively. The calculation circuits 4sx to 4vx calculate the tap coefficients H*_xi, H*_xq, H*_yi and H*_yq at the time (k+1) of the next calculation processing, respectively, based on the tap coefficients H*_xi, H*_xq, H*_yi and H*_yq at the time k obtained in the previous calculation processing and the step size μ. An example of the calculation processing is given below.

(Formulae 22 to 25)

$$H^*\_xi[k] = (Hxi\_xi[k] Hxq\_xi[k] Hyi\_xi[k] Hyq\_xi[k])^T \quad (22)$$

$$H^*\_xq[k] (Hxi\_xq[k] Hxq\_xq[k] Hyi\_xq[k] Hyq\_xq[k])^T \quad (23)$$

$$H^*\_yq[k] = (Hxi\_yi[k] Hxq\_yi[k] Hyi\_yi[k] Hyq\_yi[k])^T \quad (24)$$

$$H^*\_yq[k] = (Hxi\_yq[k] Hxq\_yq[k] Hyi\_yq[k] Hyq\_yq[k])^T \quad (25)$$

The tap coefficients H*_xi[k], H*_xq[k], H*_yi[k] and H*_yq[k] at the time k are represented by the above-mentioned formulae (22) to (25). For example, the tap coefficient H*_xi[k] of the electric field signal Xi is considered as an example, the tap coefficients Hxi_xi[k], Hxq_xi[k], Hyi_xi[k] and Hyq_xi[k] are set to the FIR filters 30a to 30d, respectively.

(Formulae 26 to 29)

$$Hxi\_xi[k] = (h0xi\_xi[k] h1xi\_xi[k] h2xi\_xi[k] \ldots hnxi\_xi[k]) \quad (26)$$

$$Hxq\_xi[k] = (h0xq\_xi[k] h1xq\_xi[k] h2xq\_xi[k] \ldots hnxq\_xi[k]) \quad (27)$$

$$Hyi\_xi[k] = (h0yi\_xi[k] h1yi\_xi[k] h2yi\_xi[k] \ldots hnyi\_xi[k]) \quad (28)$$

$$Hyq\_xi[k] = (h0yq\_xi[k] h1yq\_xi[k] h2yq\_xi[k] \ldots hnyq\_xi[k]) \quad (29)$$

The tap coefficients Hxi_xi[k], Hxq_xi[k], Hyi_xi[k] and Hyq_xi[k] include the tap coefficients h0*_* to hn*_* which are the tap coefficients of the FIR filters 30a to 30d, respectively, as illustrated by the above-mentioned formulae (26) to (29). Similarly to the tap coefficient H*_xi[k], the tap coefficients H*_xq[k], H*_yi[k] and H*_yq[k] of the other electric field signals Xq, Yi and Yq also include the tap coefficients h0 to hn of the sets of the FIR filters 31a to 31d, 32a to 32d, and 33a to 33d, respectively.

(Formulae 30 to 36)

$$H^*\_xi[k+1] = H^*\_xi[k] + \mu \cdot e\_xi[k] Da[k]^* \quad (30)$$

$$e\_xi[k] = Rxi[k] - H^*\_xi[k]^T Da[k] \quad (31)$$

$$Da[k]^T = (Da\_xi[k] Da\_xq[k] Da\_yi[k] Da\_yq[k]) \quad (32)$$

$$Da\_xi[k] = (Dxi[k] Dxi[k-1] \ldots Dxi[k-n]) \quad (33)$$

$$Da\_xq[k] = (Dxq[k] Dxq[k-1] \ldots Dxq[k-n]) \quad (34)$$

$$Da\_yi[k] = (Dyi[k] Dyi[k-1] \ldots Dyi[k-n]) \quad (35)$$

$$Da\_yq[k] = (Dyq[k] Dyq[k-1] \ldots Dyq[k-n]) \quad (36)$$

For example, the tap coefficient H*_xi[k+1] of the electric field signal Xi at the time (k+1) is calculated from the tap coefficient H*_xi[k] at the time k by the matrix calculation formula of the above-mentioned formula (30). In the formula (30), the data Da[k] is a matrix represented by the formula (32). The data Da_xi[k], Da_xq[k], Da_yi[k] and Da_yq[k] in the formula (32) include the data Dxi, Dxq, Dyi and Dyq at the time k, as represented by the formulae (33) to (36), respectively.

The code e_xi[k] is calculated by the above-mentioned formula (31). The code Rxi[k] is the replica signal Rxi at the time k. The tap coefficients H*_xq[k+1], H*_yi[k+1] and H*_yq[k+1] of other electric field signals Xq, Yi and Yq are also calculated by the same formulae used in the calculation of the tap coefficients H*_xi[k+1].

Thus, the coefficient calculation unit 14 updates the tap coefficients H*_xq, H*_yi and H*_yq based on the tap coefficients H*_xq, H*_yi and H*_yq before the update, the replica signal R, and the frame signal before the distortion is compensated. Therefore, the coefficient calculation unit 14 can suppress amounts of fluctuation of the tap coefficients H*_xq, H*_yi and H*_yq at the time of update, as compared with the case of using the minimum mean square error method.

As described above, the frame signal includes data of the electric field signals Xi, Xq, Yi and Yq. The data of the electric field signals Xi and Yi is an example of the data of the I component, and the data of the electric field signals Xq and Yq is an example of the data of the Q component. The data of the electric field signals Xi and Xq of the X-polarized wave is an example of the data of a first polarized wave component, and the data of the electric field signals Yi and Yq of the Y-polarized wave is an example of the data of a second polarized wave component.

The distortion compensation unit 704a of this example has filter circuits 3a to 3d to which the tap coefficients H*_xi, H*_xq, H*_yi and H*_yq are set by the coefficient calculation unit 14, respectively. The filter circuits 3a and 3c compensate for the distortion of the data of the electric field signals Xi and Yi of the I component by filtering the data of the electric field signals Xi, Xq, Yi and Yq. The filter circuits 3b and 3d compensate for the distortion of the data of the electric field signals Xq and Yq of the Q component by filtering the data of the electric field signals Xi, Xq, Yi and Yq.

Therefore, the distortion compensation unit 704a can compensate for the distortion caused by a crosstalk between the electric field signals Xi and Yi of the I component and the electric field signals Xq and Yq of the Q component. The filter circuits 3a and 3c are examples of a first filter circuit, and the filter circuits 3b and 3d are examples of a second filter circuit.

The filter circuits 3a and 3b compensate for the distortion of the data of the electric field signals Xi and Xq of the X-polarized wave component of the optical signal St by filtering the data of the electric field signals Xi, Xq, Yi and Yq. The filter circuits 3c and 3d compensate for the distortion of the data of the electric field signals Yi and Yq of the Y-polarized wave component of the optical signal St by filtering the data of the electric field signals Xi, Xq, Yi and Yq.

Therefore, the distortion compensation unit 704a can compensate for the distortion caused by a crosstalk between the electric field signals Xi and Xq of the X-polarized wave component and the electric field signals Yi and Yq of the Y-polarized wave component. The filter circuits 3a and 3b are examples of a third filter circuit, and the filter circuits 3c and 3d are examples of a fourth filter circuit. The X-polarized wave component and the Y-polarized wave component are examples of the first polarized wave component and the second polarized wave component, respectively.

(Switching of Replica Signal R)

In the above example, the replica signal R includes synchronization data, main signal data, and parity, but a switching means for switching the replica signal R may be provided so that any of the synchronization data and parity can be omitted.

Figure 14:
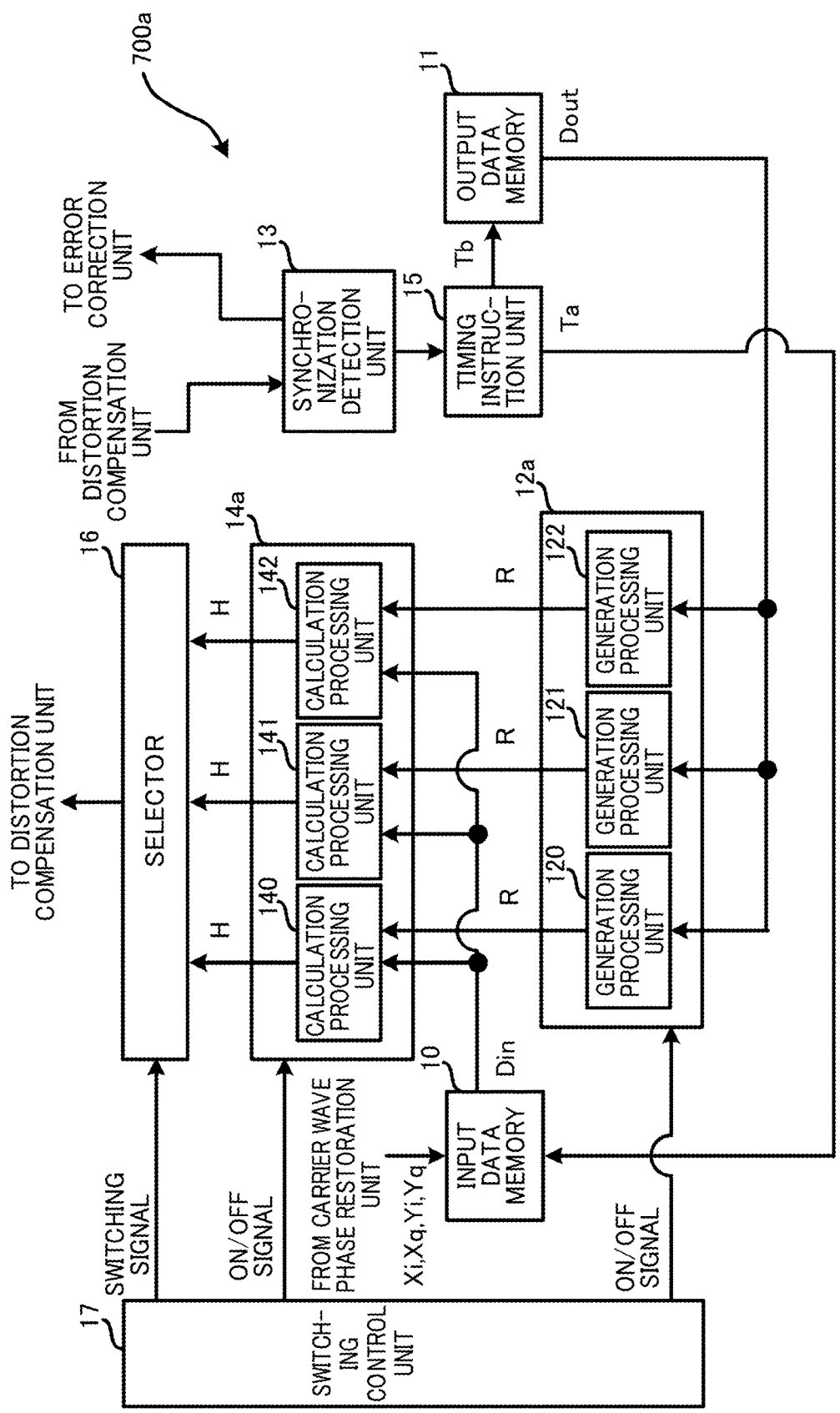
FIG. 14 is a block diagram illustrating an example of another signal control unit.

FIG. 14 is a block diagram illustrating an example of another signal control unit 700a. The reception device 7 on the receiving side has a signal control unit 700a instead of the signal control unit 700 described above. In FIG. 14, elements corresponding to those in FIG. 3 are designated by identical reference numerals, and the description thereof is omitted.

The signal control unit 700a includes the input data memory 10, the output data memory 11, a replica signal generation unit 12a, the synchronization detection unit 13, a coefficient calculation unit 14a, the timing instruction unit 15, a selector 16 and a switching control unit 17.

The replica signal generation unit 12a has three generation processing units 120 to 122. Each of the generation processing units 120 to 122 starts or stops by an on/off signal input from the switching control unit 17. The switching control unit 17 outputs the on/off signal to the replica signal generation unit 12a so that only one of the generation processing units 120 to 122 starts and operates, and the others stop.

The generation processing units 120 to 122 generate replica signals R having different configurations from each other, respectively. The replica signals R generated by the generation processing units 120 to 122 are input to the coefficient calculation unit 14a.

The coefficient calculation unit 14a has three calculation processing units 140 to 142. The replica signals R generated by the generation processing units 120 to 122 are input to the calculation processing units 140 to 142, respectively. Each of the calculation processing units 140 to 142 starts or stops by an on/off signal input from the switching control unit 17. The switching control unit 17 outputs the on/off signal to the coefficient calculation unit 14a so that only one of the calculation processing units 140 to 142 starts and operates, and the others stop.

The calculation processing units 140 to 142 calculate the tap coefficients H corresponding to the replica signals R generated by the generation processing units 120 to 122. Any one of the tap coefficients H calculated by the calculation processing units 140 to 142 is input to the distortion compensation unit 704 via the selector 16.

The selector 16 selects the replica signal R to be output to the distortion compensation unit 704 from the replica signals R generated by the calculation processing units 140 to 142. The selector 16 selects the replica signal R to be output to the distortion compensation unit 704, according to a switching signal from the switching control unit 17.

The switching control unit 17 switches the generation processing units 120 to 122, the calculation processing units 140 to 142, and the selector 16 according to an instruction from an unillustrated management device, for example. The switching control unit 17 outputs on/off signals to the replica signal generation unit 12a and the coefficient calculation unit 14a so that only one set of the generation processing unit 120 and the calculation processing unit 140, the generation processing unit 121 and the calculation processing unit 141, and the generation processing unit 122 and the calculation processing unit 142 starts. The switching control unit 17 outputs the switching signal to the selector 16 so that the tap coefficient H calculated by one of the calculated processing units 140 to 142 in the started set is selected.

Thereby, the replica signal R generated by one of the generation processing units 120 to 122 selected by the switching control unit 17 is output to the distortion compensation unit 704.

Figure 15:
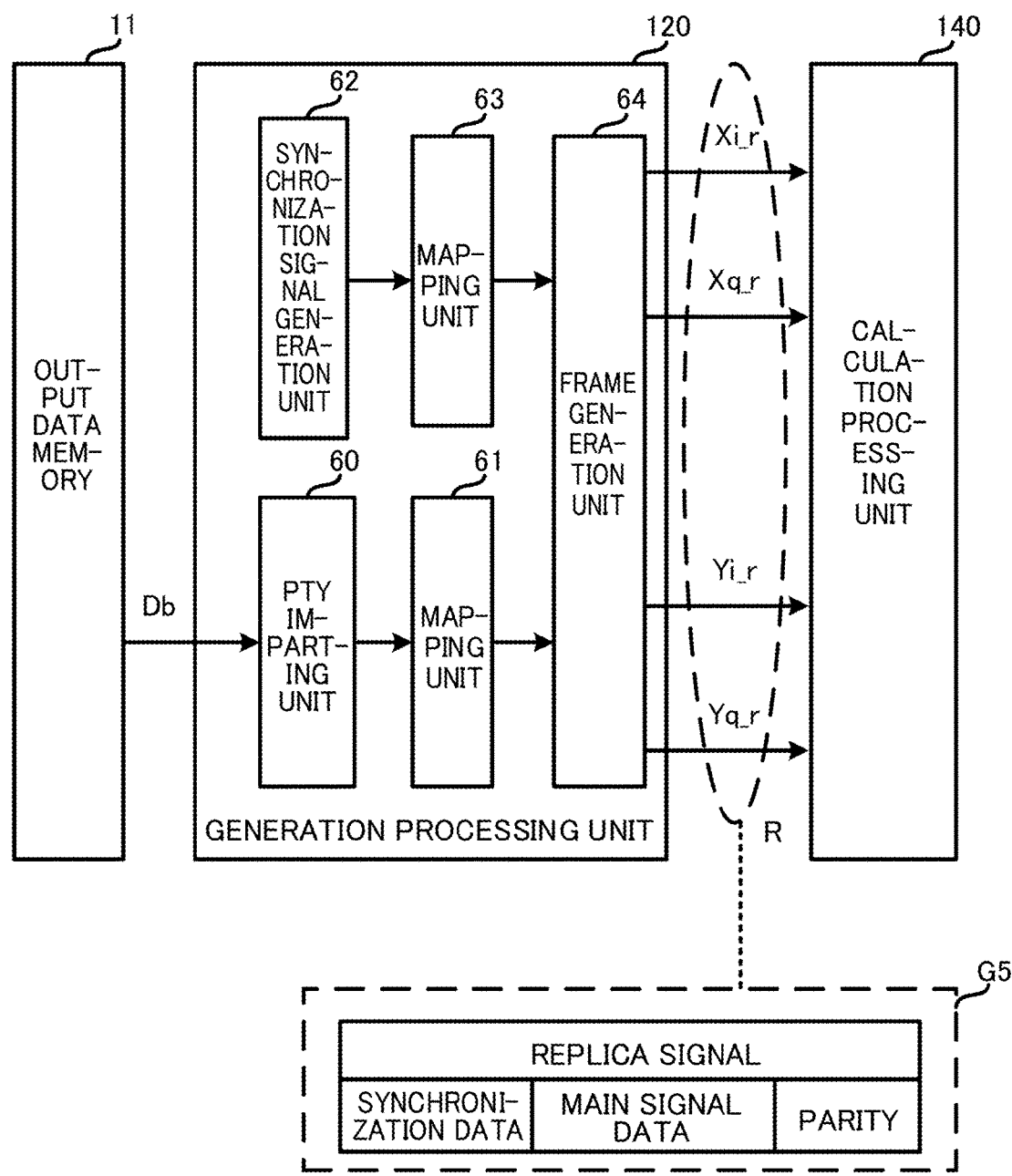
FIG. 15 is a block diagram illustrating an example of a generation processing unit.

FIG. 15 is a block diagram illustrating an example of the generation processing unit 120. In FIG. 15, elements corresponding to those in FIG. 4 are designated by identical reference numerals, and the description thereof is omitted.

The generation processing unit 120 includes the PTY imparting unit 60, the mapping units 61 and 63, the synchronization signal generation unit 62 and the frame generation unit 64. Therefore, the generation processing unit 120 generates the replica signal R including the synchronization data, the main signal data and the parity in the same manner as the replica signal generation unit 12, as indicated by a code G5. The synchronization data, the main signal data and the parity are used to calculate the tap coefficient H by the calculation processing unit 140.

Figure 16:
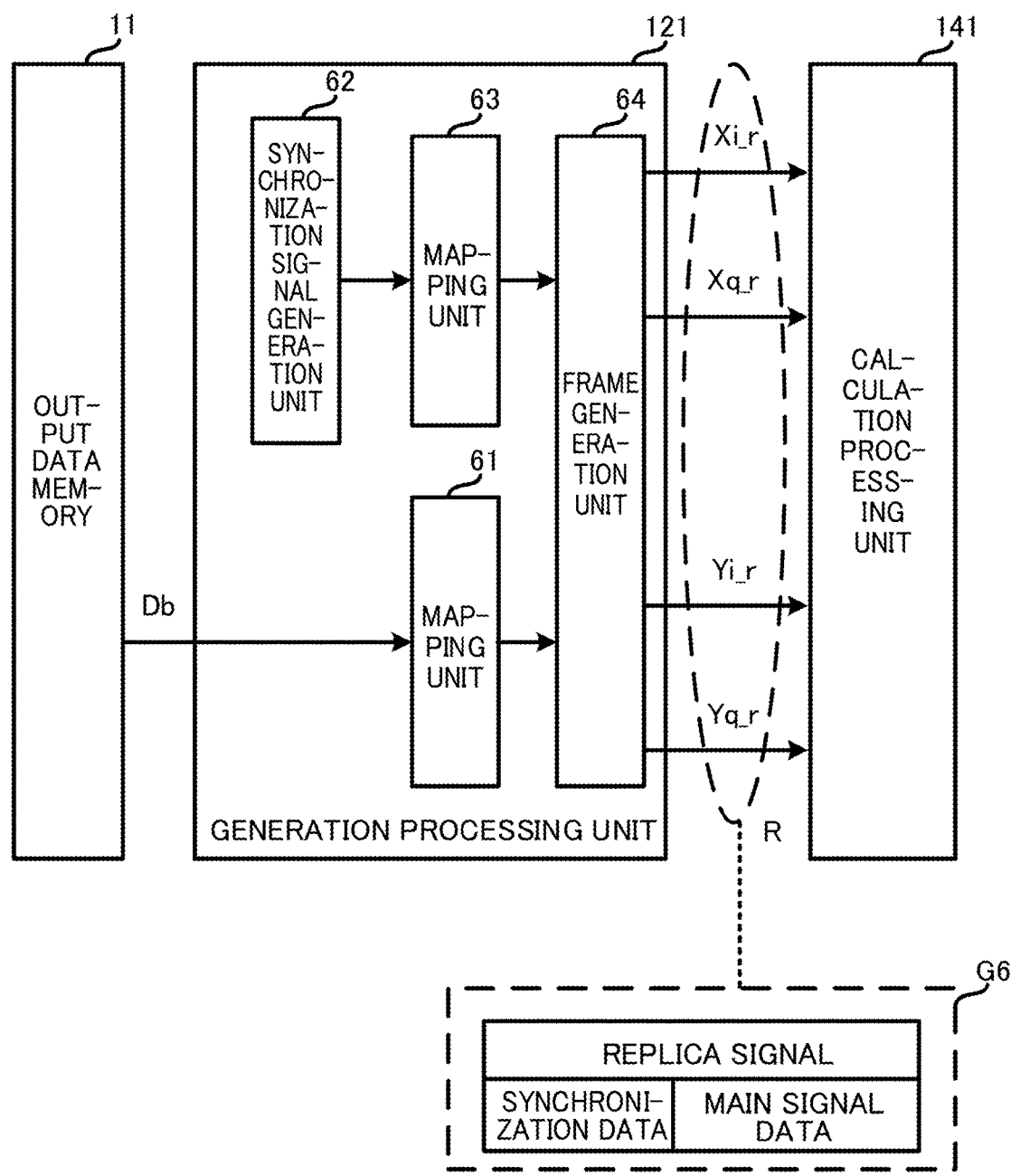
FIG. 16 is a block diagram illustrating an example of another generation processing unit.

FIG. 16 is a block diagram illustrating an example of another generation processing unit 121. In FIG. 16, elements corresponding to those in FIG. 4 are designated by identical reference numerals, and the description thereof is omitted.

The generation processing unit 121 has the mapping units 61 and 63, the synchronization signal generation unit 62, and the frame generation unit 64, but does not have the PTY imparting unit 60. Therefore, unlike the replica signal generation unit 12, the generation processing unit 121 generates the replica signal R that does not include the parity and includes only the synchronization data and the main signal data, as indicated by a code G6. The synchronization data and the main signal data are used to calculate the tap coefficient H by the calculation processing unit 141.

Figure 17:
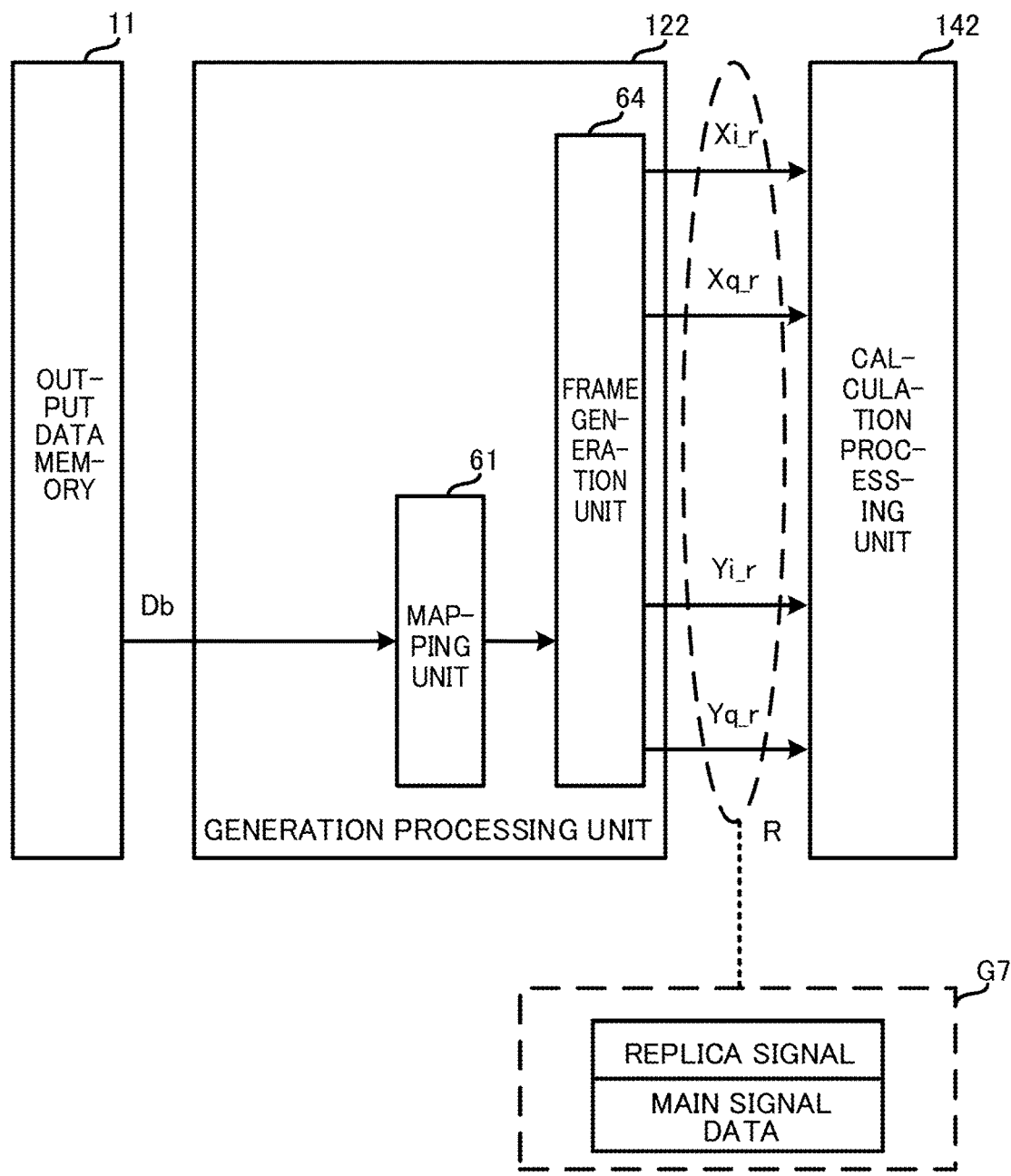
FIG. 17 is a block diagram illustrating an example of the other generation processing unit.

FIG. 17 is a block diagram illustrating an example of the other generation processing unit 122. In FIG. 17, elements corresponding to those in FIG. 4 are designated by identical reference numerals, and the description thereof is omitted.

The generation processing unit 122 has the mapping unit 61 and the frame generation unit 64, but does not have the PTY imparting unit 60, the synchronization signal generation unit 62, and the mapping unit 63. Therefore, unlike the replica signal generation unit 12, the generation processing unit 122 generates the replica signal R that does not include the synchronization data and the parity but includes only the main signal data, as illustrated by a code G7. The main signal data is used to calculate the tap coefficient H by the calculation processing unit 142.

In this way, the replica signal generation unit 12a generates the replica signal by omitting the synchronization data or the error correction code from the synchronization data, the main signal data and the error correction code according to the selection by the switching control unit 17. Therefore, the replica signal generation unit 12a can generate the appropriate replica signal R according to the frame signal.

(Example Using a Processor)

The reception device 7 may include a signal control unit 700b including a processor 18 instead of the signal control units 700 and 700a described above.

Figure 18:
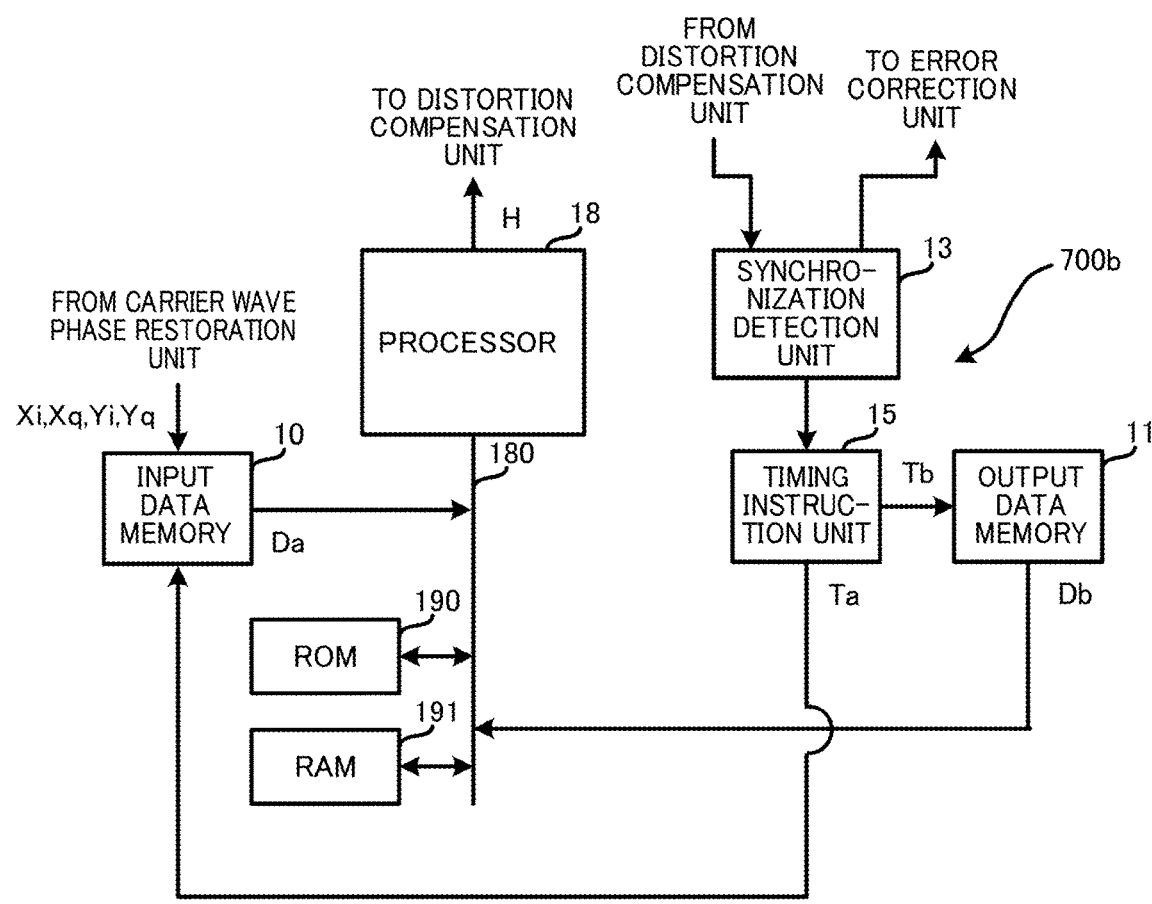
FIG. 18 is a block diagram illustrating an example of the signal control unit including a processor.

FIG. 18 is a block diagram illustrating an example of the signal control unit 700b including the processor 18. In FIG. 18, elements corresponding to those in FIG. 3 are designated by identical reference numerals, and the description thereof is omitted.

The signal control unit 700b includes the input data memory 10, the output data memory 11, the synchronization detection unit 13, the timing instruction unit 15, the processor 18, a ROM (Read Only Memory) 190 and a RAM (Random Access Memory) 191. The input data memory 10, the output data memory 11, the ROM 190 and the RAM 191 are connected to a bus 180 of the processor 18.

The processor 18 is a CPU (Central Processing Unit), for example, and operates according to a program read from the ROM 190. The processor 18 may be provided outside the reception processing circuit 70.

The ROM 190 stores the program that drives the processor 18. The program includes the same functions as the replica signal generation units 12, 12a and the coefficient calculation units 14, 14a. The RAM 191 functions as a working memory of the processor 18.

Figure 19:
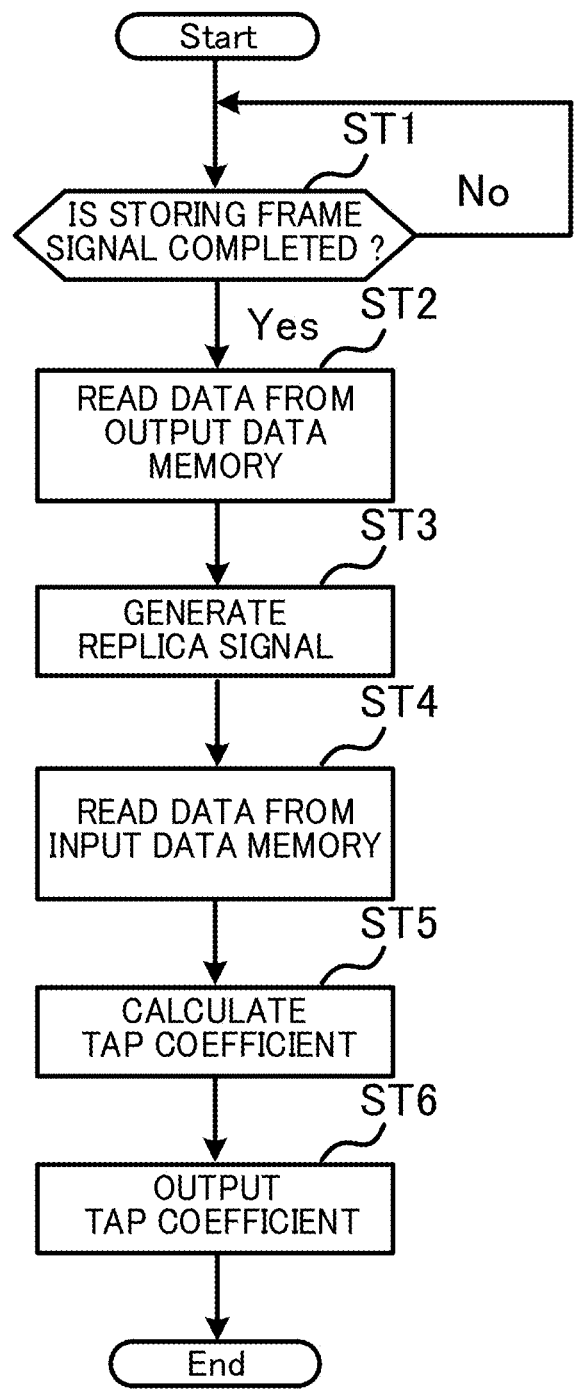
FIG. 19 is a flowchart illustrating an example of a process to be executed by the processor.

FIG. 19 is a flowchart illustrating an example of a process to be executed by the processor 18. The processor 18 executes the following process according to the program read from the ROM 190.

The processor 18 determines whether storing the frame signal in the input data memory 10 and the output data memory 11 is completed (step ST1). When storing the frame signal is not completed (No in step ST1), the processor 18 executes the process of step ST1 again.

When storing the frame signal is completed (Yes in step ST1), the processor 18 reads the data Db of the frame signal after the error is corrected, from the output data memory 11 (step ST2). Next, the processor 18 generates the replica signal R from the data Db (step ST3).

Next, the processor 18 reads the data Da of the frame signal before the error correction from the input data memory 10 (step ST4). Next, as described above, the processor 18 calculates the tap coefficient H from the data Da and Db according to the minimum mean square error method or the least mean square method (step ST5). Next, the processor 18 outputs the tap coefficient H to the distortion compensation unit 704 (step ST6). In this way, the processor 18 executes the process.

In this way, the processor 18 executes the same process as the replica signal generation units 12, 12a and the coefficient calculation units 14, 14a. Therefore, it is possible to obtain the same effects as those obtained by the signal control units 700 and 700a. The processor 18 is an example of the generator and the update processor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A reception device comprising:
   a receiver configured to receive a frame signal including synchronization data, main signal data, and an error correction code;
   a compensator configured to compensate for distortion of the frame signal based on a compensation coefficient;
   a detector configured to detect synchronization timing of the frame signal from the synchronization data;
   a corrector configured to correct an error of the frame signal according to the synchronization timing after the distortion is compensated, based on the error correction code;
   a generator configured to generate a replica signal from the frame signal after the error is corrected by the corrector, based on the synchronization timing, the replica signal corresponding to the frame signal before the distortion is compensated; and
   an update processor configured to update the compensation coefficient based on the replica signal and the frame signal before the distortion is compensated.

2. The reception device as claimed in claim 1, wherein the update processor updates the compensation coefficient based on the compensation coefficient before the update, the replica signal, and the frame signal before the distortion is compensated.

3. The reception device as claimed in claim 1, wherein
   the frame signal includes data of an I component and a Q component, the compensator has a first filter circuit and a second filter circuit to which compensation coefficients are set by the update processor, respectively,
   the first filter circuit compensates for distortion of the data of the I component by filtering the data of the I component and the Q component, and
   the second filter circuit compensates for distortion of the data of the Q component by filtering the data of the I component and the Q component.

4. The reception device as claimed in claim 1, wherein
   the frame signal includes data of a first polarized wave component and a second polarized wave component included in an optical signal,
   the compensator has a first filter circuit and a second filter circuit to which compensation coefficients are set by the update processor, respectively,
   the first filter circuit compensates for distortion of the data of the first polarized wave component by filtering the data of the first polarized wave component and the second polarized wave component, and
   the second filter circuit compensates for distortion of the data of the second polarized wave component by filtering the data of the first polarized wave component and the second polarized wave component.

5. The reception device as claimed in claim 1, further comprising:
   a first storage configured to store the frame signal before the distortion is compensated;
   a second storage configured to store the frame signal after the error is corrected by the corrector; and
   a storage processor configured to store the frame signal in the first storage at first timing whose reference is the synchronization timing, and store the frame signal in the second storage at second timing whose reference is the synchronization timing;
   wherein the generator reads the frame signal which is a generation source of the replica signal from the second storage, and
   the update processor reads the frame signal corresponding to the replica signal from the first storage.

6. The reception device as claimed in claim 1, wherein the generator generates the replica signal by omitting at least one of the synchronization data and the error correction code among the synchronization data, the main signal data and the error correction code according to selection.

7. A distortion compensation method executed by a reception device, the method comprising:

receiving a frame signal including synchronization data, main signal data, and an error correction code;

compensating for distortion of the frame signal based on a compensation coefficient;

detecting synchronization timing of the frame signal from the synchronization data;

correcting an error of the frame signal according to the synchronization timing after the distortion is compensated, based on the error correction code;

generating a replica signal from the frame signal after the error is corrected, based on the synchronization timing, the replica signal corresponding to the frame signal before the distortion is compensated; and updating the compensation coefficient based on the replica signal and the frame signal before the distortion is compensated.

8. The distortion compensation method as claimed in claim 7, wherein the updating updates the compensation coefficient based on the compensation coefficient before the update, the replica signal, and the frame signal before the distortion is compensated.

9. The distortion compensation method as claimed in claim 7, wherein the frame signal includes data of I component and Q component, the compensating for the distortion comprising:

compensating for distortion of the data of the I component by filtering the data of the I component and the Q component; and compensating for distortion of the data of the Q component by filtering the data of the I component and the Q component.

10. The distortion compensation method as claimed in claim 7, wherein the frame signal includes data of a first polarized wave component and a second polarized wave component included in an optical signal, the compensating for the distortion comprising:

compensating for distortion of the data of the first polarized wave component by filtering the data of the first polarized wave component and the second polarized wave component; and compensating for distortion of the data of the second polarized wave component by filtering the data of the first polarized wave component and the second polarized wave component.

11. The distortion compensation method as claimed in claim 7, the method further comprising:

storing the frame signal before the distortion is compensated in a first storage at first timing whose reference is the synchronization timing;

storing the frame signal after the error is corrected in a second storage at second timing whose reference is the synchronization timing;

reading the frame signal which is a generation source of the replica signal from the second storage; and reading the frame signal corresponding to the replica signal from the first storage.

12. The distortion compensation method as claimed in claim 7, wherein the generating generates the replica signal by omitting at least one of the synchronization data and the error correction code among the synchronization data, the main signal data and the error correction code according to selection.

* * * * *